United States Patent
Hanafusa et al.

(10) Patent No.: US 11,980,927 B2
(45) Date of Patent: May 14, 2024

(54) RECIPROCATING LINEAR MOTION MECHANISM FOR CAN BODY MAKER AND CAN BODY MAKER

(71) Applicants: Universal Can Corporation, Tokyo (JP); G&P Inc., Tokyo (JP)

(72) Inventors: Tatsuya Hanafusa, Tokyo (JP); Naoyuki Yaguchi, Makinohara (JP); Hideyuki Hiramatsu, Kikugawa (JP)

(73) Assignees: Universal Can Corporation, Tokyo (JP); G&PInc., Tokyo (JP)

( * ) Notice: Subject to any disclaimer, the term of this patent is extended or adjusted under 35 U.S.C. 154(b) by 456 days.

(21) Appl. No.: 17/217,160

(22) Filed: Mar. 30, 2021

(65) Prior Publication Data
US 2022/0016689 A1    Jan. 20, 2022

(30) Foreign Application Priority Data

Jul. 20, 2020  (JP) ................................ 2020-123742
Jul. 20, 2020  (JP) ................................ 2020-123743

(51) Int. Cl.
*B21D 51/26*     (2006.01)
(52) U.S. Cl.
CPC .................................... *B21D 51/26* (2013.01)
(58) Field of Classification Search
CPC ...... B21D 51/26; B21D 22/28; B21D 45/003; B21D 45/006; B21D 45/065; F16H 21/365
USPC .......................................................... 72/349
See application file for complete search history.

(56) References Cited

U.S. PATENT DOCUMENTS

| | | | | |
|---|---|---|---|---|
| 1,912,821 A | * | 6/1933 | Cameron | B21D 51/2615 |
| | | | | 72/401 |
| 5,400,635 A | * | 3/1995 | Kawaguchi | B21D 45/06 |
| | | | | 72/349 |

FOREIGN PATENT DOCUMENTS

| | | |
|---|---|---|
| EP | 0437305 A1 | 7/1991 |
| EP | 0589203 B1 | 4/1997 |
| JP | 06071350 A | 3/1994 |
| JP | 08052518 A | 2/1996 |
| JP | 3158312 B | 4/2001 |
| JP | 2004132416 A | 4/2004 |
| JP | 2005-169485 A | 6/2005 |
| JP | 2021070034 A | 5/2021 |

(Continued)

OTHER PUBLICATIONS

European Search Report dated Dec. 13, 2021 for the corresponding European Patent Application No. 21184732.2.

(Continued)

*Primary Examiner* — Adam J Eiseman
*Assistant Examiner* — Fred C Hammers
(74) *Attorney, Agent, or Firm* — Leason Ellis LLP; Melvin C. Garner; Mitsuhiro Haraguchi

(57) ABSTRACT

A housing including an internal gear having a first central axis as a center; a first rotating body relatively rotatably joined to the housing; a second rotating body including an external gear having a second central axis parallel to the first central axis as a center and meshing with an internal gear and relatively rotatably joined to the first rotating body; a ram shaft joining part connected to the second rotating body and configured to be linearly moved in a reciprocating manner in a prescribed direction; and an air supply path passing through the insides of the first rotating body, the second rotating body, and the ram shaft joining part are provided.

10 Claims, 10 Drawing Sheets

(56) References Cited

FOREIGN PATENT DOCUMENTS

WO      2008022229 A2     2/2008

OTHER PUBLICATIONS

Japanese Office Action mailed Feb. 27, 2024 for the corresponding Japanese Patent Application No. 2020-123742 (5 pages including English translation).
Japanese Notice of Allowance mailed Feb. 27, 2024 for the corresponding Japanese Patent Application No. 2020-123743 (4 pages including English translation).

* cited by examiner

RECIPROCATING LINEAR MOTION MECHANISM FOR CAN BODY MAKER AND CAN BODY MAKER

CROSS-REFERENCE TO RELATED APPLICATION

This application claims the benefit of priority to Japanese Patent Application No. 2020-123742, filed Jul. 20, 2020 and Japanese Patent Application No. 2020-123743, filed Jul. 20, 2020, both of which are incorporated herein by reference in their entireties.

FIELD OF THE INVENTION

The present invention relates to a reciprocating linear motion mechanism for a can body maker and a can body maker.

BACKGROUND OF THE INVENTION

In the related art, bottomed tubular drawing and ironing (DI) cans are known. DI cans (hereinafter may be simply referred to as "cans" in some cases) are produced by subjecting blanks in a disk shape made of alloys such as aluminum or iron to a cupping process, a DI process, or the like. In a cupping process, blanks are drawn to form cup-shaped bodies. In a DI process, cup-shaped bodies are squeezed between punches and dies while pressed using cup holders. After DI processes, air is discharged from punches into cans to release the cans from the punches.

As can body makers in which DI processes are performed on cup-shaped bodies, for example, the can body makers described in Japanese Unexamined Patent Application, First Publication No. 2005-169485 and Japanese Patent No. 3158312 are known. Can body makers linearly move punches in a reciprocating manner in a prescribed stroke direction via ram shafts using reciprocating linear motion mechanisms. Furthermore, can body makers release (blow off) formed cans from punches using air discharge mechanisms.

In Japanese Unexamined Patent Application, First Publication No. 2005-169485 and Japanese Patent No. 3158312, air discharge mechanisms supply air to punches from the outside of reciprocating linear motion mechanisms through ram shafts.

CITATION LIST

Patent Documents

[Patent Document 1] Japanese Unexamined Patent Application, First Publication No. 2005-169485
[Patent Document 2] Japanese Patent No. 3158312

SUMMARY OF THE INVENTION

In the can body makers in the related art, when air is blown toward the inner surfaces of formed cans at the right time, the cans are removed from the punches without any problem and jamming of the cans (the cans becoming crushed and clogged in the devices). Furthermore, improving the production efficiency of cans by reducing the number of facility outages due to jams is required. Incidentally, although the can body makers in the related art have a structure in which air is supplied from external air supply sources to ram shafts via hoses or the like, the hoses are connected to the ram shafts which are operating violently. Thus, the frequency of maintenance of connection parts and replacement of parts is high.

An object of the present invention is to provide a reciprocating linear motion mechanism for a can body maker and a can body maker in which the frequency of maintenance of an air supply structure and replacement of parts can be minimized to a low level, jamming can be minimized by stably blowing air to a formed can, and the production efficiency of cans can be increased.

An aspect of a reciprocating linear motion mechanism for a can body maker of the present invention includes: a housing including an internal gear having a first central axis as a center; a first rotating body located inside the housing (for example, in a radial direction orthogonal to the first central axis) and relatively rotatably joined to the housing (for example, around the first central axis); a second rotating body including an external gear having a second central axis as a center parallel to the first central axis and meshing with the internal gear and relatively rotatably joined to the first rotating body (for example, around the second central axis); a ram shaft joining part connected to the second rotating body and configured to be linearly moved in a reciprocating manner in a prescribed direction (for example, in the radial direction); and an air supply path passing through the insides of the first rotating body, the second rotating body, and the ram shaft joining part. Furthermore, it is preferable that the air supply path be arranged at least inside the first rotating body and include an air chamber having air stored therein.

Also, an aspect of a can body maker of the present invention includes: the reciprocating linear motion mechanism for a can body maker; a ram shaft extending in the prescribed direction and having one end portion to which the ram shaft joining part is joined; a punch disposed at the other end portion of the ram shaft; a die having a through hole into which the punch is inserted; a cup holder pressed against an end surface of the die in which the through hole opens; and an air discharge mechanism configured to supply air to the punch through the inside of the reciprocating linear motion mechanism for a can body maker and the ram shaft. In addition, the air discharge mechanism includes the air supply path.

In the present invention, since the air supply path passes through the inside of the reciprocating linear motion mechanism, air can be supplied from the inside of the reciprocating linear motion mechanism to the punch through the ram shaft. According to the present invention, it is possible to minimize the number of moving parts and reduce the frequency of maintenance and replacement of parts as compared with the structure in which air is supplied from the outside of the reciprocating linear motion mechanism to the ram shaft as in the related art.

According to the present invention, it is possible to reduce the frequency of maintenance of the air supply structure and replacement of parts, it is possible to stably blow air to a formed can, jamming can be minimized, and the production efficiency of cans can be increased.

When a flow path for air is simply formed inside the reciprocating linear motion mechanism, there is a concern concerning a decrease in pressure when the can is released from the punch and the flow path for air opens to the atmosphere becoming large and a can to be formed next which cannot be stably released from the punch.

Thus, an object of the present invention is to provide a reciprocating linear motion mechanism for a can body maker and a can body maker in which a decrease in pressure in the flow path for air is minimized to a low level while air is supplied to the ram shaft through the inside of the reciprocating linear motion mechanism and a formed Also, according to the present invention, the air supply path includes the air chamber. Thus, when air is temporarily stored in the air chamber, it is possible to minimize a decrease in pressure when the can is released from the punch and the air supply path opens to the atmosphere to a low level. That is to say, it is possible to alleviate a sudden decrease in pressure in the air supply path due to blow-off (release) of the formed can using the air chamber and it is possible to restore a pressure in the air supply path to a prescribed value or more in a short time. For this reason, the air supply pressure from the air supply path to the punch is stable and the can to be formed next can be stably released from the punch. Cans can be formed and blown off at a high speed and cans with stable quality can be efficiently produced and productivity can be improved.

To be specific, since the air chamber is disposed at least inside the first rotating body, a large volume for the air chamber can be secured. For this reason, the function of the air chamber described above is stable and the action and the effects of the present invention are stably achieved.

Here, the present invention is not limited thereto. In addition, in the present invention, the air chamber may be disposed as a part of the air discharge mechanism of the can body maker. That is to say, for example, the air chamber may be disposed in a member other than the first rotating body of the reciprocating linear motion mechanism, disposed in the ram shaft or the punch on the downstream side of the air from the reciprocating linear motion mechanism, or disposed in a member on the upstream side of the air from the reciprocating linear motion mechanism.

It is preferable that the reciprocating linear motion mechanism for a can body maker include a shaft body extending in the axial direction (for example, about the first central axis) and connected to the first rotating body, the second rotating body be disposed on one side of the first rotating body in the axial direction, the shaft body be disposed on the other side of the first rotating body in the axial direction, and the air chamber include a first chamber disposed inside the first rotating body and a second chamber disposed inside the shaft body and integrally formed with the first chamber.

In this case, since the air chamber includes the first chamber and the second chamber, a larger volume of the air chamber as a whole is secured. It is possible to minimize a decrease in pressure in the air supply path when the can is blown off from the punch to a low level using the air chamber. It is possible to stably release the can from the punch.

In the reciprocating linear motion mechanism for a can body maker, it is preferable that the first chamber have an inner diameter dimension larger than that of the second chamber and the second chamber have an axial dimension larger than that of the first chamber.

Since the first rotating body has a large outer diameter dimension, a large inner diameter dimension can easily be secured for the first chamber located inside the first rotating body. Since the shaft body has a large axial dimension, it is easy to secure a large axial dimension in the second chamber located inside the shaft body.

That is to say, according to the above constitution of the present invention, a large volume of the air chamber can be stably secured.

In the reciprocating linear motion mechanism for a can body maker, it is preferable that the second chamber include a large-diameter chamber located in a portion of the second chamber on one side in the axial direction and connected to the first chamber and a small-diameter chamber located on a portion of the second chamber on the other side in the axial direction and having an inner diameter dimension smaller than that of the large-diameter chamber.

In this case, the large-diameter chamber secures a large volume in which air can be stored inside the shaft body. The small-diameter chamber secures a volume in which air can be stored therein while the rigidity of the shaft body is secured.

An aspect of a reciprocating linear motion mechanism for a can body maker of the present invention includes: a housing including an internal gear having a first central axis as a center; a first rotating body located inside the housing (for example, in a first radial direction orthogonal to the first central axis) and relatively rotatably joined to the housing (for example, around the first central axis); a second rotating body including an external gear having a second central axis as a center parallel to the first central axis and meshing with the internal gear and relatively rotatably joined to the first rotating body (for example, around the second central axis); a ram shaft joining part connected to the second rotating body, having a third central axis as a center parallel to the second central axis, and configured to be linearly moved in a reciprocating manner in a prescribed direction (for example, in the first radial direction) while rotating around the third central axis; a valve part connected to the ram shaft joining part; and an air supply path passing through insides of the first rotating body, the second rotating body, the ram shaft joining part, and the valve part. In addition, the valve part has a flow mode in which air is able to pass therein and a cutoff mode in which air is unable to pass therein switched between in accordance with a rotation position around the third central axis of the ram shaft joining part.

Also, an aspect of a can body maker of the present invention includes: the reciprocating linear motion mechanism for a can body maker; a ram shaft extending in the prescribed direction and having one end portion to which the ram shaft joining part is joined; a punch disposed at the other end portion of the ram shaft; a die having a through hole into which the punch is inserted; a cup holder pressed against an end surface of the die in which the through hole opens; and an air discharge mechanism configured to supply air to the punch through an inside of the reciprocating linear motion mechanism for a can body maker and the ram shaft. In addition, the air discharge mechanism includes the air supply path.

In the present invention, since the air supply path passes through the inside of the reciprocating linear motion mechanism, air can be supplied from the inside of the reciprocating linear motion mechanism to the punch through the ram shaft. According to the present invention, it is possible to reduce the number of moving parts and the frequency of maintenance and replacement of parts compared with the structure in which air is supplied from the outside of the reciprocating linear motion mechanism to the ram shaft as in the related art.

Even in the case of a structure in which air is supplied to the ram shaft through the inside of the reciprocating linear motion mechanism, it is necessary to blow off the formed can in a timely manner.

Thus, one object of the present invention is to provide a reciprocating linear motion mechanism for a can body maker and a can body maker capable of supplying air to the ram shaft through the inside of the reciprocating linear motion mechanism and blowing off a formed can in a timely manner.

Therefore, in the present invention, the valve part is switched between the flow mode and the cutoff mode in accordance with a rotation position of the ram shaft joining part around the third central axis. That is to say, the supply and the cutoff of air from the air supply path to the ram shaft are switched between depending on whether the valve part is in the flow mode or the cutoff mode. To be specific, when the ram shaft joining part is linearly moved in a reciprocating manner in a prescribed direction (a stroke direction) while rotating around the third central axis, in a prescribed region in the stroke direction, air is supplied to the ram shaft through the valve part, and in other regions different from the prescribed region, the supply of air to the ram shaft through the valve part is cut off.

In the present invention, air can be discharged from the punch to the inside of the can in a timely manner by mechanically synchronizing with the operation of the reciprocating linear motion mechanism and by a simple structure compared with a case in which the air discharge is controlled by electrically synchronizing with the operation of the reciprocating linear motion mechanism, for example, using an electromagnetic valve, a sensor, a control unit, or the like unlike the present invention. For example, even when the forming rate of the can is changed, the formed can can be blown off in a timely manner without requiring complicated adjustment work or the like to synchronize the air discharge timing.

According to the present invention, it is possible to minimize the frequency of maintenance of the air supply structure and replacement of parts to a low level, the formed can can be stably air-blown, jamming is minimized, and the production efficiency of the can is improved.

In the reciprocating linear motion mechanism for a can body maker, it is preferable that the valve part include a ram shaft fixing part and a rotating part connected to the ram shaft joining part and configured to be relatively rotatable around the ram shaft fixing part and the third central axis, the ram shaft fixing part include an outer cylinder part having the third central axis as a center and a long air hole passing through the outer cylinder part in a radial direction (for example, the third radial direction) orthogonal to the third central axis and extending around the third central axis, the rotating part include an inner cylinder part located inside the outer cylinder part in the radial direciton (for example, the third radial direction), an axial flow path extending in the axial direction inside the inner cylinder part and connected to the air flow path of the ram shaft joining part, and a radial flow path extending in the radial direction (for example, the third radial direction) inside the inner cylinder part and opening in the axial flow path and an outer circumferential surface of the inner cylinder part, and the radial flow path communicate with the long air hole in a prescribed range around the third central axis.

In this case, while the rotating part rotates around the third central axis with respect to the ram shaft fixing part together with the ram shaft joining part and the radial flow path communicates with the long air hole in a prescribed range around the third central axis, the valve part is in the flow mode. In the flow mode, air is supplied from the air supply path to the ram shaft.

Also, while the rotating part rotates around the third central axis with respect to the ram shaft fixing part together with the ram shaft joining part and the communication between the radial flow path and the long air hole is cut off in a range other than the prescribed range around the third central axis, the valve part is in the cutoff mode. In the cutoff mode, the supply of air from the air supply path to the ram shaft is cut off.

According to the above constitution of the present invention, the formed can can be blown off in a timely and stable manner with a simple structure.

In the reciprocating linear motion mechanism for a can body maker, it is preferable that the position of the long air hole around the third central axis can be adjusted by rotating the outer cylinder part around the third central axis.

In this case, it is possible to adjust a timing at which the long air hole communicates with the radial flow path by adjusting the position of the long air hole around the third central axis. That is to say, it is possible to adjust a timing at which air is discharged into a can by a simple operation in which the outer cylinder part is rotated around the third central axis. For this reason, it is possible to stably blow off the formed can from the punch.

In the reciprocating linear motion mechanism for a can body maker, it is preferable that the ram shaft fixing part include the outer cylinder part, a fixing cylinder part located outside the outer cylinder part in the radial direction (for example, the third radial direction), and a fixing screw configured to fix the fixing cylinder part and the outer cylinder part, the fixing cylinder part include a long adjusting hole passing through the fixing cylinder part in the radial direction (for example, the third radial direction) and extending around the third central axis, and the fixing screw be inserted into the long adjusting hole and screwed to the outer cylinder part.

In this case, it is possible to position the long air hole around the third central axis by the fixing cylinder part and the outer cylinder part through the fixing screw in a state in which the outer cylinder part is rotated around the third central axis with respect to the fixing cylinder part and the position of the long air hole around the third central axis is adjusted. That is to say, it is possible to adjust the position of the long air hole around the third central axis and fix the position thereof with a simple constitution.

According to the reciprocating linear motion mechanism for a can body maker and the can body maker in an aspect of the present invention, it is possible to minimize the frequency of maintenance of the air supply structure and replacement of parts to a low level, jamming is minimized by stably air-blowing the formed can, and it is possible to increase the production efficiency of the cans.

According to the reciprocating linear motion mechanism for a can body maker and the can body maker in an aspect of the present invention, it is possible to minimize a decrease in pressure in the air flow path to a low level while supplying air to the ram shaft through the inside of the reciprocating linear motion mechanism and it is possible to stably release the formed can from the punch.

According to the reciprocating linear motion mechanism for a can body maker and the can body maker in an aspect of the present invention, it is possible to supply air to the ram shaft through the inside of the reciprocating linear motion mechanism and blow off the formed can in a timely manner.

DETAILED DESCRIPTION OF THE INVENTION

A can body maker 1 and a reciprocating linear motion mechanism 10 of the can body maker 1 (hereinafter may be simply referred to as a reciprocating linear motion mechanism 10 in some cases) in an embodiment of the present invention will be described with reference to the drawings.

Figure 1:
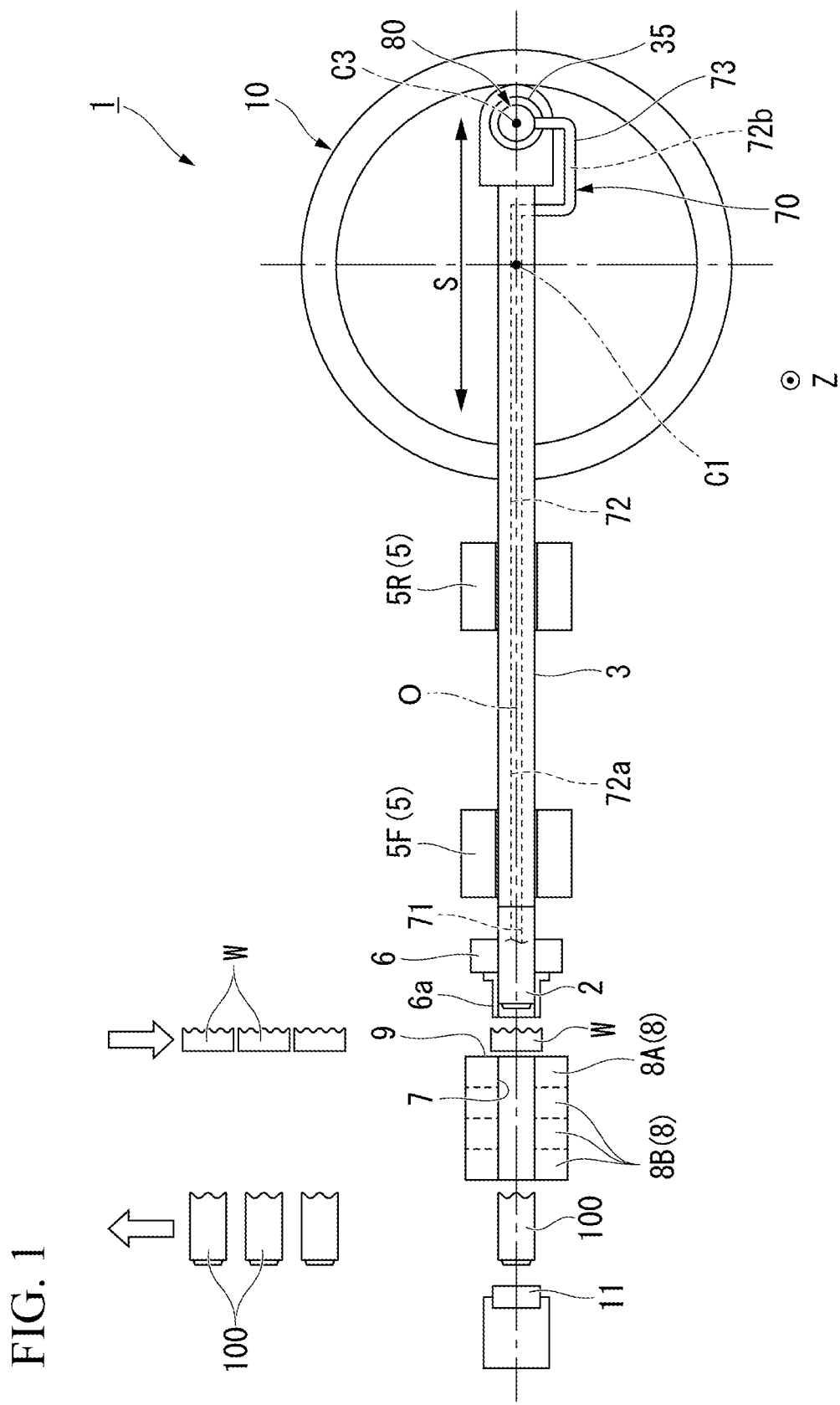
FIG. 1 is a schematic diagram schematically illustrating a can body maker in an embodiment.

As illustrated in FIG. 1, the can body maker 1 in the embodiment is a DI can producing device in which a DI can 100 is produced by subjecting a cup-shaped body W which is a workpiece to a DI process.

First, the DI can 100 will be described.

The DI can 100 has a bottomed tubular shape. The DI can 100 is used for a can body such as a two-piece can or a bottle can which is filled with contents such as a drink and sealed. In the case of a two-piece can, a can body includes the DI can 100 and a can lid in a disk shape wrapped around an opening end portion of the DI can 100. In the case of a bottle can, a can body includes a bottle can main body obtained by subjecting the DI can 100 to a necking process, a screwing process, and the like and a cap which is screwed to an opening end portion of the bottle can main body.

The DI can 100 is formed to have a bottomed tubular shape by subjecting a blank in a disk shape punched from a plate member made of an aluminum alloy or the like to a cupping process (a squeezing process) and a DI process (a squeezing and ironing process). To be specific, for example, in the case of a two-piece can, the DI can 100 is produced through a plate member punching process, a cupping process, a DI process, a trimming process, a printing process, an inner surface coating process, a necking process, and a flanging process in this order.

In the process of producing the DI can 100, a cup-shaped body W is formed by drawing (subjecting) a blank (to a cupping process) through a cupping press. That is to say, the cup-shaped body W is an intermediate body produced in the process of transitioning from the blank to the DI can 100 in the cupping process. The cup-shaped body W has a bottomed tubular shape having a smaller circumferential wall height (length in an axial direction of the can) and a larger diameter than those of the DI can 100.

The can body maker 1 will be described below.

The can body maker 1 is used in the DI process. The can body maker 1 performs a DI process, that is, a drawing (re-drawing) and ironing process on the cup-shaped body W to form the DI can 100 having a larger circumferential wall height and a smaller diameter than those of the cup-shaped body W. Furthermore, the can body maker 1 forms a bottom of the DI can 100 such that it has a dome shape in the DI process. That is to say, in the embodiment, the can 100 formed by the can body maker 1 is the DI can 100.

The can body maker 1 includes the reciprocating linear motion mechanism 10, a ram shaft 3 extending in a prescribed direction (hereinafter may be referred to as a "stroke direction S" in some cases) in which a ram shaft joining part 35 which will be described later of the reciprocating linear motion mechanism 10 linearly moves in a reciprocating manner and having one end portion to which the ram shaft joining part 35 is joined, a punch 2 disposed at the other end portion of the ram shaft 3, ram bearings 5 configured to reciprocally support the ram shaft 3 in an axial direction of a central axis O of the ram shaft 3, a die 8 having a through hole 7 into which the punch 2 is inserted, a cup holder 6 pressed against an end surface 9 in which the through hole 7 of the die 8 opens, a domer 11 in which the bottom of the DI can 100 is arranged between the domer 11 and the punch 2 and which forms a dome shape therein, and an air discharge mechanism 70 configured to supply air to the punch 2 through the inside of the reciprocating linear motion mechanism 10 and the ram shaft 3.

The ram shaft 3, the punch 2, the ram bearings 5, the through hole 7 of the die 8, the cup holder 6, and each central axis O of the domer 11 are arranged coaxially with each other. In the embodiment, the central axis O which is a common axis of these members extends in a horizontal direction.

Also, the can body maker 1 includes a cup feeder (not shown) configured to supply the cup-shaped body W on the end surface 9 of the die 8, a receiving seat (not shown) configured to hold the cup-shaped body W on the end surface 9, a can transport mechanism (not shown) configured to transport the formed DI can 100 to the outside of the apparatus, a cup holder drive mechanism (not shown) driven in synchronization with the reciprocating linear motion mechanism 10 and configured to move the cup holder 6 in a reciprocating manner in the axial direction of the central axis O with a stroke length different from that of the ram shaft joining part 35 of the reciprocating linear motion mechanism 10, and a drive source (not shown) such as a drive motor.

The reciprocating linear motion mechanism 10 converts a rotational driving force around a first central axis C1 input from the drive source into a reciprocating linear motion in the stroke direction S along the central axis O and outputs the force to the ram shaft joining part 35. A specific constitution of the reciprocating linear motion mechanism 10 will be described separately.

The ram shaft 3 has an axial shape in which the ram shaft 3 extends along the central axis O. The ram shaft 3 is slidably supported by the pair of ram bearings 5 disposed apart from each other in the axial direction of the central axis O.

The punch 2 has a cylindrical shape or a columnar shape in which the punch 2 extends along the central axis O.

The pair of ram bearings 5 are disposed between the reciprocating linear motion mechanism 10 and the die 8 in the axial direction of the central axis O. Of the pair of ram bearings 5, one ram bearing 5 disposed at a position close to the die 8 is a front bearing 5F and the other ram bearing 5 disposed at a position close to the reciprocating linear motion mechanism 10 is a rear bearing 5R. The front bearing 5F and the rear bearing 5R have a fluid bearing structure called, for example, a dynamic bearing, a hydrostatic bearing, or the like.

The plurality of dies 8 are provided side by side in the axial direction of the central axis O. Each of the plurality of dies 8 has the through hole 7 having a circular cross section in which the through hole 7 passes through the die 8 in the axial direction of the central axis O. The plurality of dies 8 include one the re-squeezing die 8A and a plurality of ironing dies 8B located closer to the domer 11 side than the re-squeezing die 8A is. Although not particularly illustrated, each pilot ring is disposed on the domer 11 side of each ironing die 8B. When the pilot ring is provided, the punch 2 coming into contact with each ironing die 8B due to the impact when the DI can 100 comes off (passes through) from each ironing die 8B in forming is minimized Also, in forming, a coolant liquid is supplied to the re-squeezing die 8A and each ironing die 8B for lubrication and cooling.

The cup holder 6 has a cylinder cup holder sleeve 6a extending in the axial direction of the central axis O. The cup holder sleeve 6a is concentrically disposed on a radial outer side of the punch 2 and is movable in the axial direction of the central axis O with respect to the punch 2. The cup holder sleeve 6a is inserted into the cup-shaped body W disposed at the end surface 9 of the re-squeezing die 8A and holds a bottom wall of the cup-shaped body W by pressing the bottom wall against the end surface 9. That is to say, the cup holder 6 supports the bottom wall of the cup-shaped body W by pressing the bottom wall against the end surface 9 facing the reciprocating linear motion mechanism 10 side of the die 8.

Although not particularly illustrated, the cup holder drive mechanism converts a rotational driving force transmitted from the drive source via the reciprocating linear motion mechanism 10 into a reciprocating motion in the axial direction of the central axis O and linearly moves the cup holder 6 in a reciprocating manner in the axial direction of the central axis O.

The domer 11 is a tooling configured to form the bottom of the DI can 100. The domer 11 has a substantially cylindrical shape extending in the axial direction of the central axis O. When the punch 2 is disposed at a forward end position in the stroke direction S, the domer 11 faces the punch 2 in the axial direction of the central axis O.

The air discharge mechanism 70 discharges air through an air discharge hole 71 which opens at at least one of a distal end surface and an outer circumferential surface of the punch 2 and releases the DI can 100 from the punch 2. The air discharge mechanism 70 includes the air discharge hole 71 which passes through the inside of the punch 2 and opens to an outer surface of the punch 2, an air supply path 28 (refer to FIGS. 4 and 9) which will be described later passes through the inside of the reciprocating linear motion mechanism 10, an air communication path 72 which passes through the inside of the ram shaft 3 and communicates the air discharge hole 71 with the air supply path 28, and an air supply source (not shown). That is to say, the air discharge mechanism 70 includes the air supply path 28.

The air communication path 72 includes a ram shaft flow path 72a connected to the air discharge hole 71 and extending in the axial direction of the central axis O inside the ram shaft 3 and a piping flow path 72b extending inside a piping member 73 such as a hose and configured to connect the ram shaft flow path 72a to the air supply path 28. The air supply source is, for example, an air compressor or the like and supplies air (compressed air) to the air supply path 28.

A DI process into the cup-shaped body W using the can body maker 1 is performed as follows.

First, the cup-shaped body W which is a work is disposed between the punch 2 and the re-squeezing die 8A in a posture in which a cup shaft (a can shaft) extends in a horizontal direction and an opening thereof is directed toward the punch 2 side. The bottom wall of the cup-shaped body W faces the end surface 9 of the re-squeezing die 8A.

The cup holder 6 and the punch 2 are moved forward in the axial direction of the central axis O with respect to the cup-shaped body W. That is to say, the cup holder 6 and the punch 2 move from the reciprocating linear motion mechanism 10 toward the die 8 side, that is, a front side in the stroke direction S. Furthermore, the punch 2 pushes the cup-shaped body W into the through hole 7 of the re-squeezing die 8A while the cup holder 6 presses the bottom wall of the cup-shaped body W against the end surface 9 of the re-squeezing die 8A to perform a cup pressing operation to draw the cup-shaped body W again.

Through the redrawing process, the cup-shaped body W is formed to have a small diameter and a length in an axial direction of the cup increases. Furthermore, the cup-shaped body W is pushed in using the punch 2 and an ironing process is performed while the cup-shaped body W sequentially passes through the through holes 7 of the plurality of ironing dies 8B. That is to say, the circumferential wall of the cup-shaped body W is squeezed and stretched to increase a height of the circumferential wall and a thickness of the circumferential wall is reduce to form a shape of the bottomed tubular DI can 100. The DI can 100 is cold-work-hardened by squeezing the circumferential wall and a strength increases.

The DI can 100 which has been subjected to the ironing process is pushed out from the through hole 7 of the die 8 toward the domer 11 side using the punch 2. Furthermore, a bottom portion of the DI can 100 (a portion which is a bottom of a can) is arranged between the punch 2 and the domer 11 and pressed so that the bottom portion of the DI can 100 is formed to have a dome shape.

The reciprocating linear motion mechanism 10 will be described below.

Figure 2:
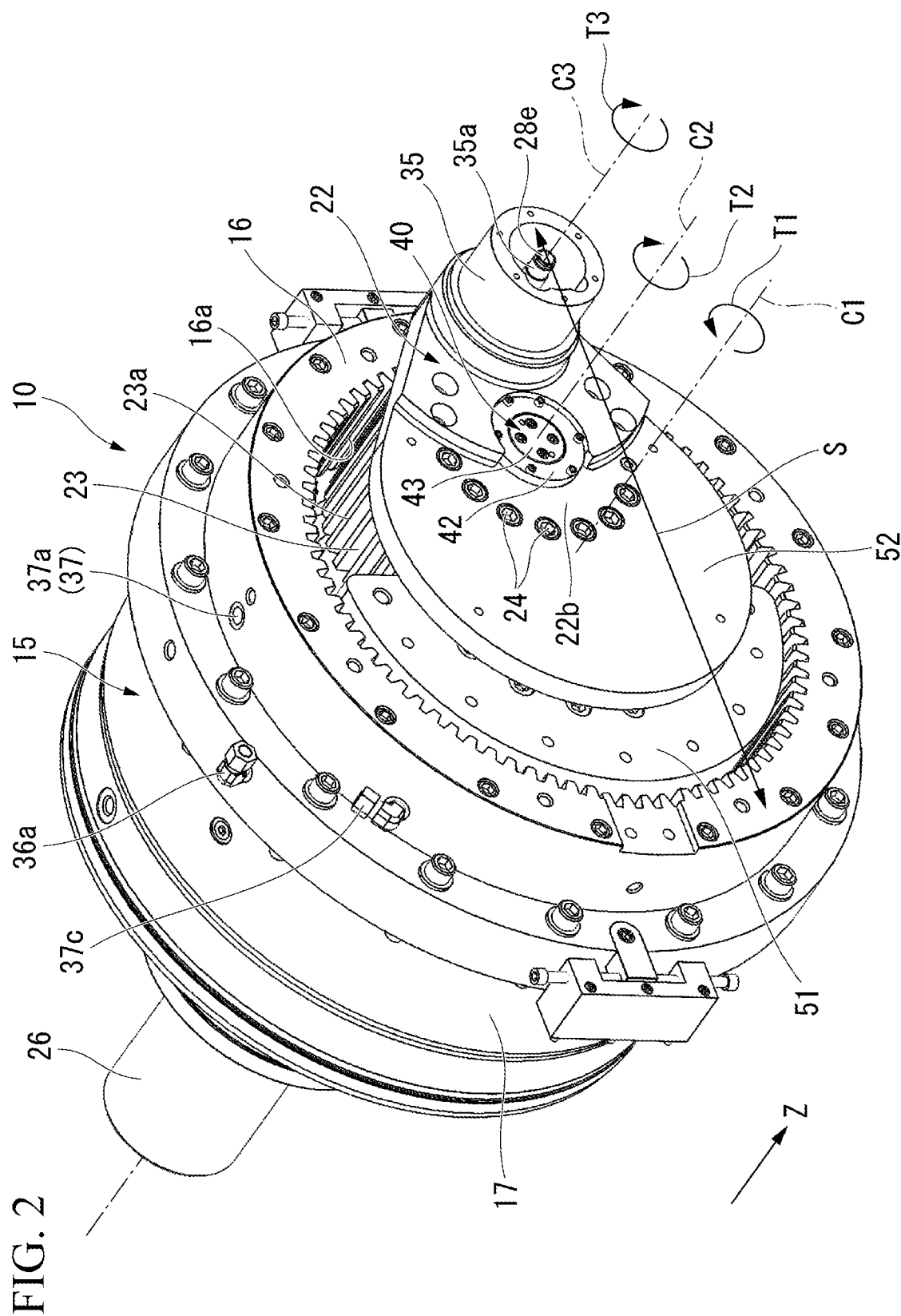
FIG. 2 is a perspective view illustrating a reciprocating linear motion mechanism for the can body maker in the embodiment.
Figure 3:
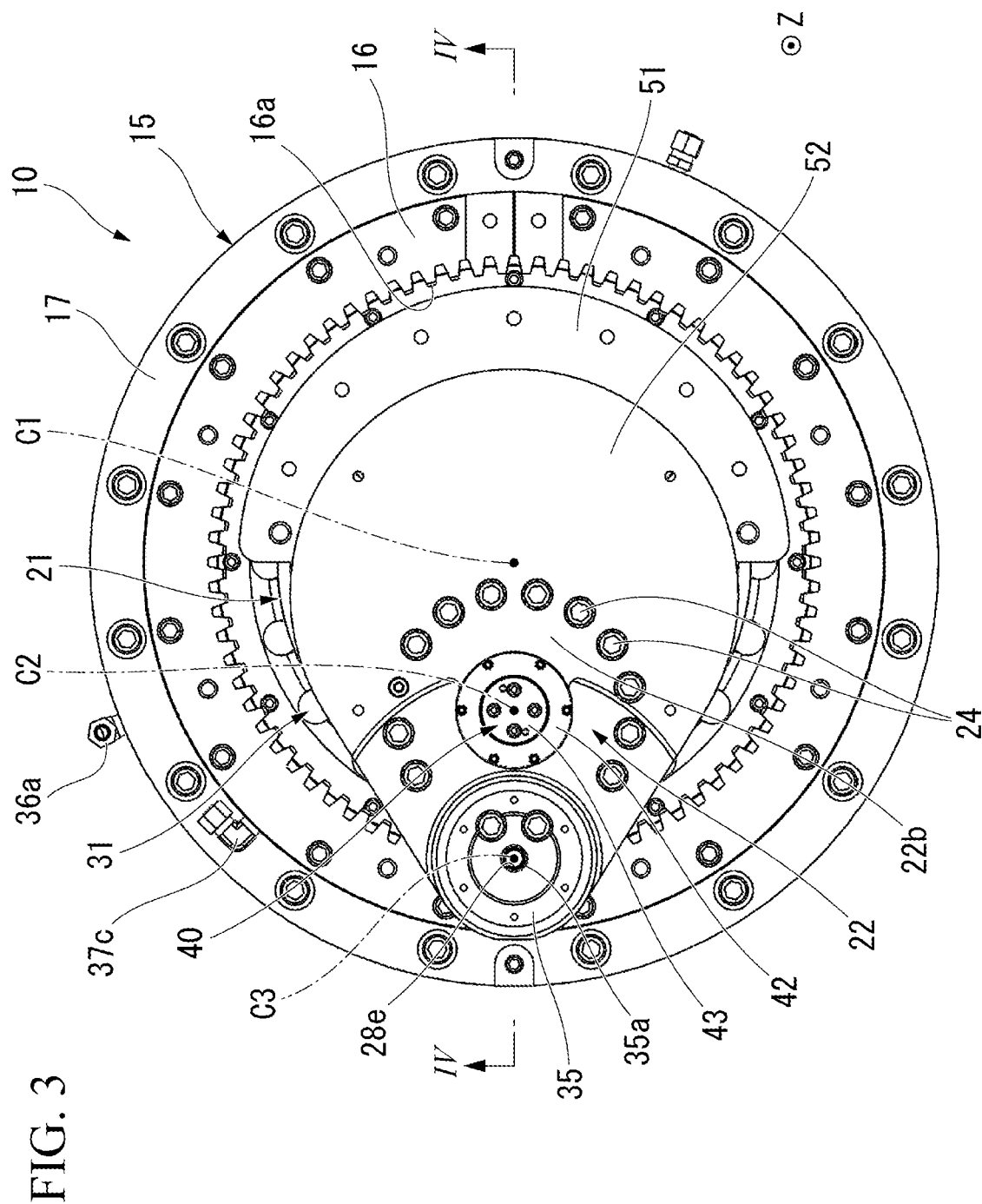
FIG. 3 is a front view illustrating the reciprocating linear motion mechanism for the can body maker in the embodiment.
Figure 4:
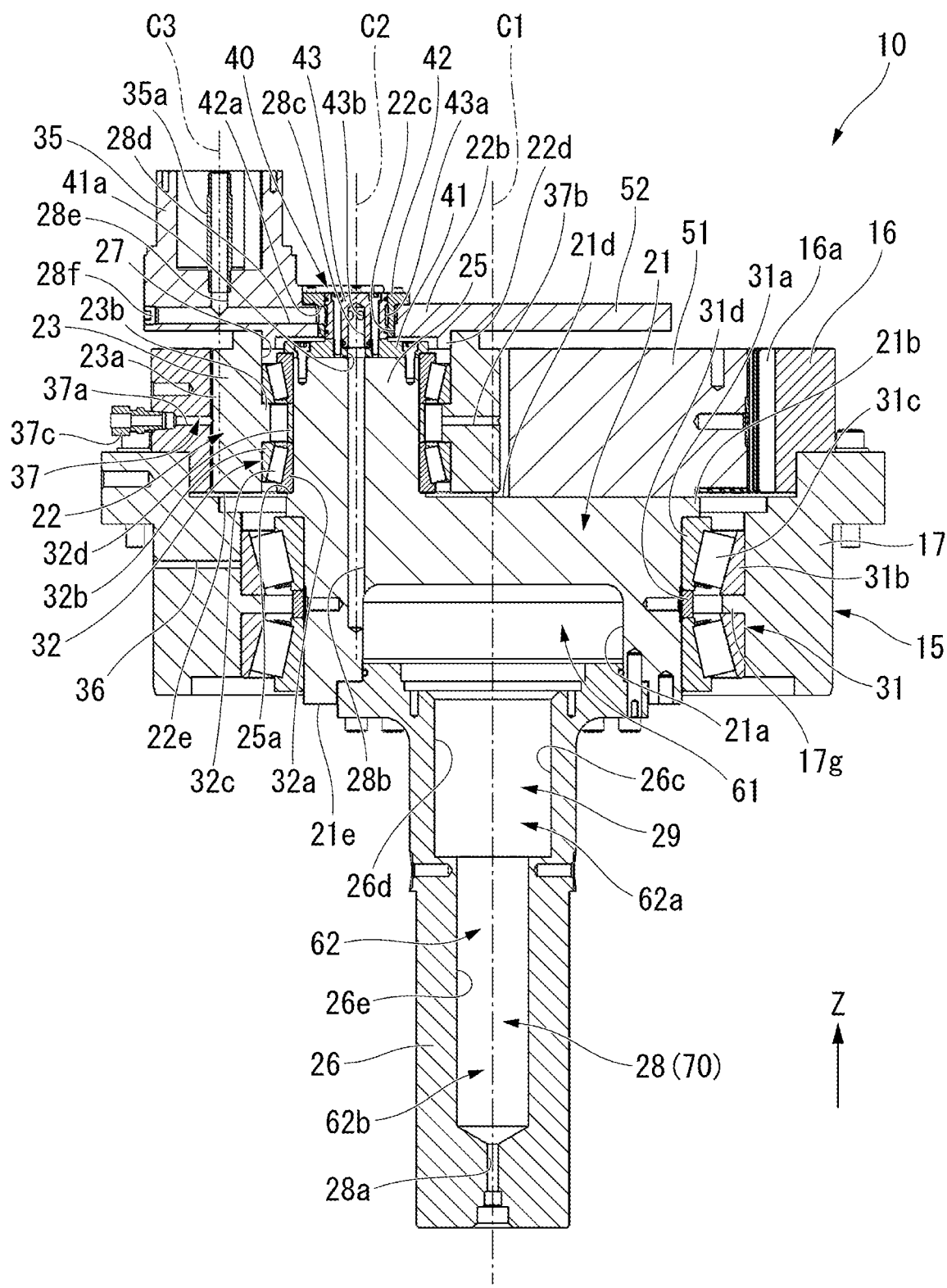
FIG. 4 is a cross-sectional view illustrating a cross section taken along IV-IV of FIG. 3.

As illustrated in FIGS. 2 to 4 and 9, the reciprocating linear motion mechanism 10 includes a housing 15 having an internal gear 16, a first rotating body 21 having a convex part 25, a first bearing 31, a second rotating body 22 having an external gear 23 and a recess 27 meshing with the internal gear 16, a second bearing 32, an air joint member 40, the ram shaft joining part 35, a first weight part 51, a second weight part 52, a shaft body 26, a valve part 80, the air supply path 28, first oil supply paths 36, second oil supply paths 37, and a gear (not shown). In FIGS. 2 to 4, the valve part 80 is not illustrated.

The housing 15, the internal gear 16 thereof, a portion of the first rotating body 21 other than the convex part 25, the first bearing 31, the shaft body 26, and the gear have the first central axis C1 as a center, that is, are disposed coaxially with each other with the first central axis C1 as a common axis. The convex part 25, the second rotating body 22, the external gear 23 thereof, the recess 27, the second bearing 32, and the air joint member 40 have a second central axis C2 as a center, that is, are disposed coaxially with each other with the second central axis C2 as a common axis. The ram shaft joining part 35 and the valve part 80 have a third central axis C3 as a center, that is are disposed coaxially with each other with the third central axis C3 as a common axis.

The first central axis C1 and the second central axis C2 are disposed parallel to each other and apart from each other. The second central axis C2 and the third central axis C3 are disposed parallel to each other and apart from each other. In the embodiment, the first central axis C1, the second central axis C2, and the third central axis C3 extend in the horizontal direction.

In the following description, a direction in which the first central axis C1 extends, a direction in which the second central axis C2 extends, and a direction in which the third central axis C3 extends are simply referred to as an "axial direction". A Z axial direction shown in each drawing corresponds to the axial direction. In the axial direction, the first rotating body 21 and the ram shaft joining part 35 are disposed at different positions from each other. A direction from the first rotating body 21 toward the ram shaft joining part 35 (a +Z side) in the axial direction is referred to as "one side in the axial direction" and a direction from the ram shaft joining part 35 toward the first rotating body 21 (a −Z side) in the axial direction is referred to as the "other side in the axial direction". One side in the axial direction may be referred to as a "front side" and the other side in the axial direction may be referred to as a "rear side".

A direction orthogonal to the first central axis C1 is referred to as a "first radial direction (a radial direction)". A direction close to the first central axis C1 in the first radial direction is referred to as an inner side in the first radial direction and a direction away from the first central axis C1 in the first radial direction is referred to as an outer side in the first radial direction.

A direction around the first central axis C1 is referred to as a "first circumferential direction". A direction in which the first rotating body 21 is rotated with respect to the housing 15 in the first circumferential direction when the can body maker 1 is in operation is referred to as a "first rotating direction T1".

A direction orthogonal to the second central axis C2 is referred to as a "second radial direction". A direction close to the second central axis C2 in the second radial direction is referred to as an "inner side in the second radial direction" and a direction away from the second central axis C2 in the second radial direction is referred to as an "outer side in the second radial direction".

A direction around the second central axis C2 is referred to as a "second circumferential direction". A direction in which the second rotating body 22 is rotated with respect to the first rotating body 21 in the second circumferential direction when the can body maker 1 is in operation is referred to as a "second rotating direction T2".

A direction orthogonal to the third central axis C3 is referred to as a "third radial direction (a radial direction)". A direction close to the third central axis C3 in the third radial direction is referred to as an "inner side in the third radial direction" and a direction away from the third central axis C3 in the third radial direction is referred to as an "outer side in the third radial direction".

A direction around the third central axis C3 is referred to as a "third circumferential direction". A direction in which the ram shaft joining part 35 is rotated with respect to the ram shaft 3 in the third circumferential direction when the can body maker 1 is in operation is referred to as a "third rotating direction T3".

As illustrated in FIG. 4, the housing 15 has a tubular shape in which the housing 15 has the first central axis C1 as a center. The housing 15 includes the internal gear 16 and a housing main body 17.

The internal gear 16 is an annular shape in which the internal gear 16 has the first central axis C1 as a center. The internal gear 16 has a cylindrical shape and extends in the axial direction. The internal gear 16 is disposed at one end portion of the housing 15 in the axial direction. The internal gear 16 is located in one opening portion of the housing 15 in the axial direction.

The internal gear 16 has a plurality of internal teeth 16a arranged side by side in the first circumferential direction on an inner circumferential portion of the internal gear 16. The internal teeth 16a are arranged on the inner circumferential portion of the internal gear 16 over the entire length in the axial direction. In the embodiment, the internal teeth 16a are exposed to the outside of the reciprocating linear motion mechanism 10 through an opening of the housing 15 on one side in the axial direction.

The housing main body 17 has a cylindrical shape in which the housing main body 17 has the first central axis C1 as a center and extends in the axial direction. The first rotating body 21 and the first bearing 31 are disposed inside the housing main body 17, that is, inside in the first radial direction. The internal gear 16 is fixed to one end portion of the housing main body 17 in the axial direction.

The housing main body 17 has a first outer ring support part 17g. The first outer ring support part 17g protrudes inward in the first radial direction from an inner circumferential surface of the housing main body 17 and extends in the first circumferential direction. The first outer ring support part 17g has an annular plate shape in which the first outer ring support part 17g has the first central axis C1 as a center. A pair of plate surfaces of the first outer ring support part 17g are directed in the axial direction.

The first rotating body 21 is located inside the housing 15 in the first radial direction. The first rotating body 21 is relatively rotatably joined to the housing 15 around the first central axis C1.

Figure 5:
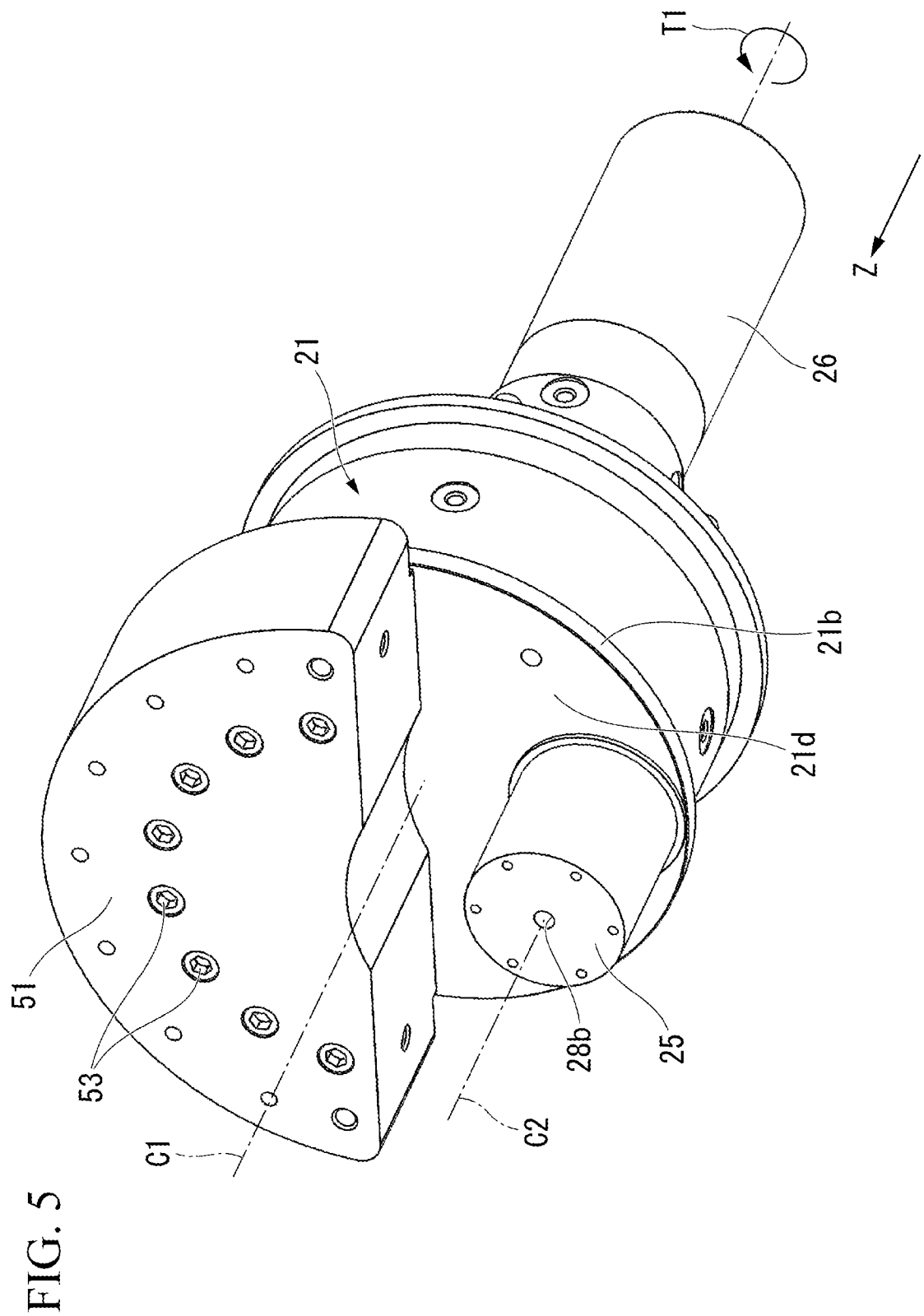
FIG. 5 is a perspective view illustrating a first rotating body, a convex part, a first weight part, and a shaft body.

As illustrated in FIGS. 4 and 5, the first rotating body 21 has a substantially columnar shape in which the first rotating body 21 has the first central axis C1 as a center. The first rotating body 21 is disposed in the housing main body 17. The first rotating body 21 is accommodated in the housing 15.

The first rotating body 21 includes a hole portion 21a, a flange portion 21b, and the convex part 25.

The hole portion 21a is recessed on one side of the first rotating body 21 in the axial direction from a surface 21e facing the other side of the first rotating body 21 in the axial direction and extends in the axial direction. The hole portion 21a has a circular hole shape in which the hole portion 21a has the first central axis C1 as a center. To be specific, the hole portion 21a is recessed on one side in the axial direction from a portion of the surface 21e facing the other side of the first rotating body 21 in the axial direction other than an outer circumferential portion. That is to say, the hole portion 21a opens on the other side in the axial direction.

The flange portion 21b is disposed at one end portion of an outer circumferential portion of the first rotating body 21 in the axial direction. The flange portion 21b has an annular plate shape in which the flange portion 21b has the first central axis C1 as a center. The flange portion 21b protrudes outward in the first radial direction from an outer circumferential surface of the first rotating body 21 and extends in the first circumferential direction. A pair of plate surfaces of the flange portion 21b are directed in the axial direction. A plate surface of the pair of plate surfaces of the flange portion 21b facing the other side in the axial direction comes into contact with inner rings 31a of the first bearing 31 from one side in the axial direction.

The convex part 25 will be described later.

The first bearing 31 is, for example, a taper roller bearing or the like. The first bearing 31 can support a load from the first radial direction (a radial load) and a load from the axial direction (an axial load). The first bearing 31 connects the housing 15 to the first rotating body 21 to be relatively rotatable around the first central axis C1.

The first bearing 31 includes the inner rings 31a, a spacer 31d, outer rings 31b, and rolling elements 31c.

Each of the inner ring 31a has a tubular shape in which the inner ring 31a has the first central axis C1 as a center. The inner ring 31a fits to the outer circumferential surface of the first rotating body 21. The plurality of inner rings 31a are provided side by side in the axial direction. In the embodiment, the first bearing 31 includes the pair of inner rings 31a disposed to be spaced apart from each other in the axial direction. The spacer 31d is disposed between the pair of inner rings 31a. The spacer 31d has a tubular shape in which the spacer 31d has the first central axis C1 as a center. The spacer 31d fits to the outer circumferential surface of the first rotating body 21.

One inner ring 31a of the pair of inner rings 31a located on one side in the axial direction is disposed between the flange portion 21b and the spacer 31d in the axial direction. The flange portion 21b comes into contact with an end surface of one inner ring 31a facing one side in the axial direction. The spacer 31d comes into contact with an end surface of one inner ring 31a facing the other side in the axial direction.

The other inner ring 31a of the pair of inner rings 31a located on the other side in the axial direction comes into contact with the spacer 31d on the end surface facing one side in the axial direction.

Each of the outer rings 31b has a tubular shape in which the outer ring 31b has the first central axis C1 as a center. The outer ring 31b is located further outward in the first radial direction than the inner ring 31a. The outer ring 31b fits to the inner circumferential surface of the housing main body 17. The plurality of outer rings 3 lb are provided side by side in the axial direction. In the embodiment, the first bearing 31 includes the pair of outer rings 3 lb disposed to be spaced apart from each other in the axial direction. The first outer ring support part 17g is disposed between the pair of outer rings 31b.

The first outer ring support part 17g comes into contact with an end surface of one outer ring 31b facing the other side in the axial direction of the pair of outer rings 31b located on one side in the axial direction.

The first outer ring support part 17g comes into contact with an end surface facing one side in the axial direction of the other outer ring 31b of the pair of outer rings 31b located on the other side in the axial direction.

Each of the rolling elements 31c is a columnar roller or the like. The rolling element 31c is disposed between the inner ring 31a and the outer ring 31b in the first radial direction. The rolling elements 31c are provided side by side in the first circumferential direction. A plurality of rows of rolling elements 31c arranged in the first circumferential direction (hereinafter simply referred to as rows of rolling elements 31c) are provided side by side in the axial direction. In the embodiment, the first bearing 31 includes a row of a pair of rolling elements 31c arranged to be spaced apart from each other in the axial direction.

A row of one rolling elements 31c of the row of a pair of rolling elements 31c located on one side in the axial direction are rotatably held between one inner ring 31a and one outer ring 31b.

A row of the other rolling elements 31c of the row of a pair of rolling elements 31c located on the other side in the axial direction are rotatably held between the other inner ring 31a and the other outer ring 31b.

The convex part 25 protrudes from a surface 21d facing one side of the first rotating body 21 in the axial direction toward one side in the axial direction and extends in the axial direction. The convex part 25 has a columnar shape in which the convex part 25 has the second central axis C2 as a center. To be specific, the convex part 25 protrudes from an outer portion of the surface 21d in the first radial direction facing one side of the first rotating body 21 in the axial direction toward one side in the axial direction.

The convex part 25 includes an outer circumferential step portion 25a.

The outer circumferential step portion 25a constitutes a part of the outer circumferential portion of the convex part 25. In the illustrated example, the outer circumferential step portion 25a is disposed at an end portion of the outer circumferential portion of the convex part 25 on the other side in the axial direction. The outer circumferential step portion 25a has an annular surface shape in which the outer circumferential step portion 25a has the second central axis C2 as a center and faces one side in the axial direction.

The second rotating body 22 is disposed on one side of the first rotating body 21 in the axial direction. The second rotating body 22 is connected to the first rotating body 21 to be relatively rotatable around the second central axis C2.

Figure 6:
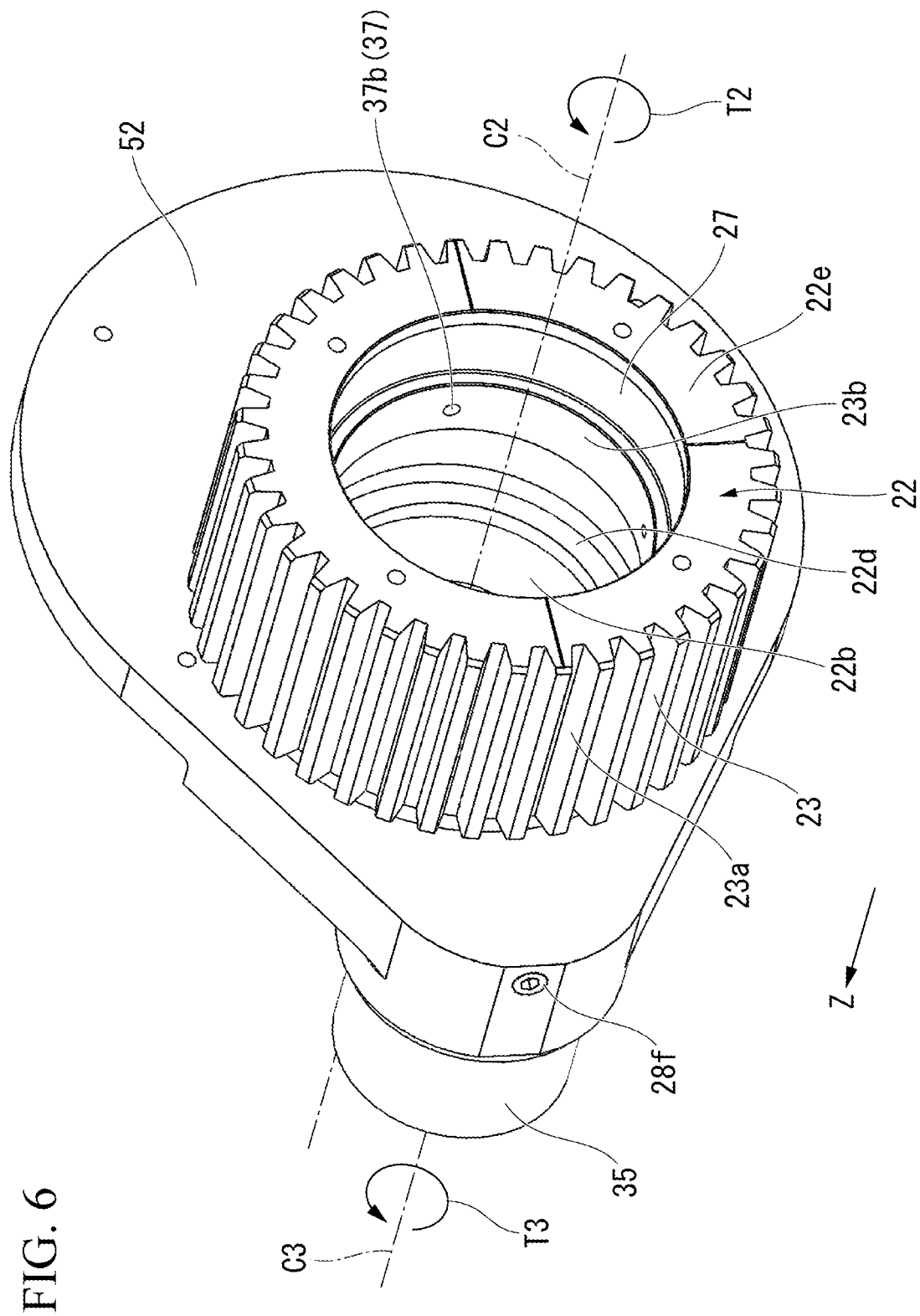
FIG. 6 is a perspective view illustrating a second rotating body, a recess, a second weight part, and a ram shaft joining part.

As illustrated in FIGS. 4 and 6, the second rotating body 22 has a substantially eclipsed tubular shape in which the second rotating body 22 has the second central axis C2 as a center. The second rotating body 22 includes the external gear 23, a top wall portion 22b, bolt members 24, a joint insertion hole 22c, and the recess 27.

The external gear 23 has a cylindrical shape in which the external gear 23 has the second central axis C2 as a center and extends in the axial direction. A part of a surface 22e facing the other side of the external gear 23 in the axial direction faces a part of the surface 21d facing one side of the first rotating body 21 in the axial direction with a gap in the axial direction. The other part of the surface 22e facing the other side of the external gear 23 in the axial direction faces a part of the first bearing 31 with a gap in the axial direction.

The external gear 23 includes a plurality of external teeth 23a arranged side by side in the second circumferential direction on an outer circumferential portion of the external gear 23. The external teeth 23a are disposed on a portion of the outer circumferential portion of the external gear 23 other than one end portion in the axial direction. In the embodiment, the external teeth 23a are exposed to the outside of the reciprocating linear motion mechanism 10 through an opening of the housing 15 on one side in the axial direction.

At least one or more of the plurality of external teeth 23a and at least one or more of the plurality of internal teeth 16a mesh with each other. A pitch circle diameter of the external teeth 23a of the external gear 23 is 1/2 of a pitch circle diameter of the internal teeth 16a of the internal gear 16.

The external gear 23 includes a second outer ring support part 23b. The second outer ring support part 23b protrudes inward in the second radial direction from an inner circumferential surface of the external gear 23 and extends in the second circumferential direction. The second outer ring support part 23b has a cylindrical shape in which the second outer ring support part 23b has the second central axis C2 as a center. A pair of end surfaces of the second outer ring support part 23b are directed in the axial direction.

In FIG. 2, when the can body maker 1 is in operation, the external gear 23 rotates (revolves) in the second rotating direction T2 while rotating (revolving) and moving in the first rotating direction T1 along the inner circumferential portion of the internal gear 16. In the embodiment, when the reciprocating linear motion mechanism 10 is viewed from one side in the axial direction, that is, viewed in a front view of the reciprocating linear motion mechanism 10, the first rotating direction T1 is a counterclockwise direction about the first central axis C1 and the second rotating direction T2 is a clockwise direction about the second central axis C2. Here, the present invention is not limited thereto, when the reciprocating linear motion mechanism 10 is viewed from one side in the axial direction, the first rotating direction T1 may be a clockwise direction about the first central axis C1 and the second rotating direction T2 may be a counterclockwise direction about the second central axis C2.

The top wall portion 22b is disposed on one side of the external gear 23 in the axial direction. The top wall portion 22b has a plate shape in which the top wall portion 22b extends in a direction perpendicular to the second central axis C2. As illustrated in FIG. 4, the top wall portion 22b is connected to an end portion of the external gear 23 on one side in the axial direction and an end portion of the ram shaft joining part 35 on the other side in the axial direction. That is to say, the top wall portion 22b connects the external gear 23 to the ram shaft joining part 35. The top wall portion 22b closes an opening of the external gear 23 on one side in the axial direction. The top wall portion 22b may be referred to as a "closing wall portion 22b or a front wall portion 22b".

The top wall portion 22b includes a fitting cylinder part 22d.

The fitting cylinder part 22d protrudes toward the other side in the axial direction from a surface of the top wall portion 22b facing the other side in the axial direction. The fitting cylinder part 22d has a tubular shape in which the fitting cylinder part 22d has the second central axis C2 as a center. The fitting cylinder part 22d is inserted into the external gear 23. The fitting cylinder part 22d fits to the inner circumferential surface of the external gear 23.

As illustrated in FIGS. 2 and 3, the top wall portion 22b is fixed to the external gear 23 using the plurality of bolt members 24 arranged side by side in the second circumferential direction. Each of the bolt members 24 extends in the axial direction. Each of the bolt members 24 is inserted into a bolt insertion hole which passes through the top wall portion 22b in the axial direction and screwed into a female screw hole of the external gear 23.

As illustrated in FIG. 4, the joint insertion hole 22c passes through the top wall portion 22b in the axial direction. The joint insertion hole 22c has a circular hole shape in which the joint insertion hole 22c has the second central axis C2 as a center.

The recess 27 is recessed on one side in the axial direction from the surface 22e facing the other side of the second rotating body 22 in the axial direction and extends in the axial direction. The recess 27 has a circular hole shape in which the recess 27 has the second central axis C2 as a center. To be specific, the recess 27 is recessed on one side in the axial direction from an inner portion in the second radial direction of the surface 22e facing the other side of the external gear 23 in the axial direction. That is to say, the recess 27 opens on the other side in the axial direction. An end portion of the recess 27 on one side in the axial direction is closed by the top wall portion 22b. The convex part 25 is inserted into the recess 27.

The second bearing 32 is, for example, a taper roller bearing or the like. The second bearing 32 can support a load from the second radial direction (a radial load) and a load from the axial direction (an axial load). The second bearing 32 connects the convex part 25 to the recess 27 to be relatively rotatable around the second central axis C2. That is to say, the second bearing 32 connects the first rotating body 21 to the second rotating body 22 to be relatively rotatable around the second central axis C2.

The second bearing 32 includes inner rings 32a, a spacer 32d, outer rings 32b, and rolling elements 32c.

Each of the inner ring 32a has a tubular shape in which the inner ring 32a has the second central axis C2 as a center. The inner ring 32a fits to an outer circumferential surface of the convex part 25. The plurality of inner rings 32a are provided side by side in the axial direction. In the embodiment, the second bearing 32 has the pair of inner rings 32a arranged to be spaced apart from each other in the axial direction. The spacer 32d is disposed between the pair of inner rings 32a. The spacer 32d has a tubular shape in which the spacer 32d has the second central axis C2 as a center. The spacer 32d fits to the outer circumferential surface of the convex part 25.

One inner ring 32a of the pair of inner rings 32a located on one side in the axial direction is disposed in the axial direction between an inner ring retainer 41 which will be described later of the air joint member 40 and the spacer 32d. The inner ring retainer 41 comes into contact with an end surface of one inner ring 32a facing one side in the axial direction. The spacer 32d comes into contact with an end surface of on inner ring 32a facing the other side in the axial direction. That is to say, one inner ring 32a is arranged between the inner ring retainer 41 and the spacer 32d from both sides in the axial direction.

The other inner ring 32a of the pair of inner rings 32a located on the other side in the axial direction is disposed in the axial direction between the spacer 32d and the outer circumferential step portion 25a. The spacer 32d comes into contact with an end surface of the other inner ring 32a facing one side in the axial direction. The outer circumferential step portion 25a comes into contact with an end surface of the other inner ring 32a facing the other side in the axial direction. That is to say, the other inner ring 32a is arranged between the spacer 32d and the outer circumferential step portion 25a from both sides in the axial direction.

Although not particularly illustrated, the surface 21d of the first rotating body 21 facing one side in the axial direction may come into contact with the end surface of the other inner ring 32a facing the other side in the axial direction. In this case, the other inner ring 32a is arranged between the surface 21d of the first rotating body 21 facing one side in the axial direction and the spacer 32d from both sides in the axial direction.

Each of the outer rings 32b has a tubular shape in which the outer ring 32b has the second central axis C2 as a center. The outer ring 32b is located further outward in the second radial direction than the inner ring 32a. The outer ring 32b fits to the inner circumferential surface of the external gear 23, that is, an inner circumferential surface of the recess 27. The plurality of outer rings 32b are provided side by side in the axial direction. In the embodiment, the second bearing 32 has the pair of outer rings 32b disposed to be spaced apart from each other in the axial direction. The second outer ring support part 23b is disposed between the pair of outer rings 32b.

The second outer ring support part 23b comes into contact with the end surface of one outer ring 32b of the pair of outer rings 32b located on one side in the axial direction which faces the other side in the axial direction.

The second outer ring support part 23b comes into contact with the end surface of the other outer ring 32b of the pair of outer rings 32b located on the other side in the axial direction which faces one side in the axial direction.

Each of the rolling element 32c is a columnar roller or the like. The rolling element 32c is disposed between the inner ring 32a and the outer ring 32b in the second radial direction. The plurality of rolling elements 32c are provided side by side in the second circumferential direction. A plurality of rows of rolling elements 32c arranged in the second circumferential direction (hereinafter simply referred to as rows of rolling elements 32c) are provided side by side in the axial direction. In the embodiment, the second bearing 32 has a row of a pair of rolling elements 32c disposed to be spaced apart from each other in the axial direction.

A row of one rolling element 32c of the row of a pair of rolling elements 32c located on one side in the axial direction is rotatably held between one inner ring 32a and one outer ring 32b.

A row of the other rolling element 32c of the row of a pair of rolling elements 32c located on the other side in the axial direction is rotatably held between the other inner ring 32a and the other outer ring 32b.

When viewed from the second radial direction, the internal gear 16, the external gear 23, the recess 27, the second bearing 32, and the convex part 25 overlap each other. That is to say, the internal gear 16, the external gear 23, the recess 27, the second bearing 32, and the convex part 25 each include a portion arranged at the same position in the axial direction. When viewed from the second radial direction, the second bearing 32, the internal gear 16, and the external gear 23 overlap over the entire length in the axial direction.

When viewed from the axial direction, a part of the second bearing 32 in the second circumferential direction and a part of the first bearing 31 in the first circumferential direction are arranged to overlap each other. That is to say, when viewed from the axial direction, a part of the second bearing 32 and a part of the first bearing 31 overlap each other.

The air joint member 40 is attached to the convex part 25 and the top wall portion 22b. The air joint member 40 has air which can flow therein and constitutes a part of a flow path of the air supply path 28.

The air joint member 40 includes the inner ring retainer 41, an outer cylinder 42, and an inner cylinder 43.

The inner ring retainer 41 has a disc shape in which the inner ring retainer 41 has the second central axis C2 as a center and extends in a direction perpendicular to the second central axis C2. A plate surface of the inner ring retainer 41 facing the other side in the axial direction comes into contact with a surface of the convex part 25 facing one side in the axial direction. The inner ring retainer 41 is fixed to the convex part 25 through screwing or the like. An outer circumferential portion of the inner ring retainer 41 protrudes further outward in the second radial direction than the outer circumferential surface of the convex part 25. The outer circumferential portion of the inner ring retainer 41 comes into contact with one inner ring 32a of the second bearing 32 from one side in the axial direction. That is to say, the inner ring retainer 41 presses the inner ring 32a of the second bearing 32 from one side in the axial direction.

The inner ring retainer 41 has a retainer air hole 41a.

The retainer air hole 41a passes through the inner ring retainer 41 in the axial direction. The retainer air hole 41a has a circular hole shape in which the retainer air hole 41a has the second central axis C2 as a center.

The outer cylinder 42 has a tubular shape in which the outer cylinder 42 has the second central axis C2 as a center and extends in the axial direction. The outer cylinder 42 is inserted into the joint insertion hole 22c. The outer cylinder 42 fits to an inner circumferential surface of the joint insertion hole 22c. The outer cylinder 42 is fixed to the top wall portion 22b through screwing or the like.

The outer cylinder 42 has an outer cylinder air hole 42a.

The outer cylinder air hole 42a passes through an circumferential wall of the outer cylinder 42 in the second radial direction. The outer cylinder air hole 42a is located on a virtual straight line connecting the third central axis C3 to the second central axis C2 of the ram shaft joining part 35 when viewed from the axial direction.

The inner cylinder 43 has an eclipsed tubular shape in which the inner cylinder 43 has the second central axis C2 as a center and extends in the axial direction. An end portion of the inner cylinder 43 on the other side in the axial direction comes into contact with a plate surface of the inner ring retainer 41 facing one side in the axial direction. The inside of the inner cylinder 43 communicates with the retainer air hole 41a of the inner ring retainer 41. The inner cylinder 43 is fixed to the inner ring retainer 41 through screwing or the like. That is to say, the inner cylinder 43 is fixed to the convex part 25 via the inner ring retainer 41. The inner cylinder 43 and the outer cylinder 42 can rotate relative to each other around the second central axis C2.

The inner cylinder 43 has an inner cylinder air groove 43a and inner cylinder air holes 43b.

The inner cylinder air groove 43a is recessed inward in the second radial direction from an outer circumferential surface of the inner cylinder 43 and extends in the second circumferential direction. The inner cylinder air groove 43a has an annular shape in which the inner cylinder air groove 43a has the second central axis C2 as a center. The inner cylinder air groove 43a communicates with the outer cylinder air hole 42a.

Each of the inner cylinder air holes 43b passes through a circumferential wall of the inner cylinder 43 in the second radial direction. The inner cylinder air hole 43b extends in the second radial direction and opens in an inner circumferential surface of the inner cylinder 43 and the inner cylinder air groove 43a. The inside of the inner cylinder 43 and the inner cylinder air groove 43a communicate with each other through the inner cylinder air hole 43b. The plurality of inner cylinder air holes 43b are provided side by side in the second circumferential direction. The plurality of inner cylinder air holes 43b have the second central axis C2 as a center and are arranged radially.

As illustrated in FIG. 2, the ram shaft joining part 35 is connected to the second rotating body 22 and is linearly moved in a reciprocating manner in a prescribed direction (the stroke direction S) in the first radial direction while rotating around the third central axis C3 having the third central axis C3 as a center. That is to say, when the can body maker 1 is in operation, the ram shaft joining part 35 linearly moves in a reciprocating manner in the stroke direction S while rotating (revolving) in the third rotating direction T3 in the third circumferential direction. In the embodiment, when the reciprocating linear motion mechanism 10 is viewed from one side in the axial direction, the second rotating direction T2 of the second rotating body 22 is a clockwise direction about the second central axis C2 and the third rotating direction T3 of the ram shaft joining part 35 is a clockwise direction about the third central axis C3. Here, the present invention is not limited thereto, and when the reciprocating linear motion mechanism 10 is viewed from one side in the axial direction, the second rotating direction T2 may be a counterclockwise direction about the second central axis C2 and the third rotating direction T3 may be a counterclockwise direction about the third central axis C3.

As illustrated in FIG. 4, the ram shaft joining part 35 has a bottomed tubular shape and extends in the axial direction. The ram shaft joining part 35 opens on one side in the axial direction. The opening of the ram shaft joining part 35 on one side in the axial direction is closed by the valve part 80 (refer to FIG. 9).

The ram shaft joining part 35 protrudes from the top wall portion 22b to one side in the axial direction. The ram shaft joining part 35 is located closer to one side in the axial direction than the housing 15. The ram shaft joining part 35 protrudes outward in the second radial direction from the top wall portion 22b.

The third central axis C3 of the ram shaft joining part 35 is parallel to the first central axis C1. The third central axis C3 of the ram shaft joining part 35 is disposed parallel to and apart from the second central axis C2. A distance between the third central axis C3 and the second central axis C2 in the second radial direction is equal to a distance between the first central axis C1 and the second central axis C2 in the second radial direction. When the reciprocating linear motion mechanism 10 is viewed from the axial direction, the third central axis C3 of the ram shaft joining part 35 is located on a pitch circle diameter of the external teeth 23a of the external gear 23.

The ram shaft joining part 35 includes an air cylinder 35a.

The air cylinder 35a is disposed inside the ram shaft joining part 35. The air cylinder 35a has a tubular shape in which the air cylinder 35a has the third central axis C3 as a center and extends in the axial direction. The air cylinder 35a has air which can flow therein and constitutes a part of a flow path of the air supply path 28.

In FIG. 1, the ram shaft joining part 35 is connected to one end portion of the ram shaft 3 via a connecting bearing 54 (refer to FIG. 9) provided on an outer circumferential portion of the ram shaft joining part 35. The connecting bearing 54 connects the ram shaft joining part 35 to the ram shaft 3 to be relatively rotatable around the third central axis C3.

As illustrated in FIGS. 4 and 5, the first weight part 51 is connected to the first rotating body 21 and is located on a side opposite to the second central axis C2 so that the first central axis C1 is arranged between the first weight part 51 and the second central axis C2 in the first radial direction. The first weight part 51 functions as a so-called counterweight configured to maintain a good rotational balance in the first circumferential direction when the first rotating body 21, the convex part 25 thereof, the second bearing 32, the second rotating body 22, the recess 27 thereof, the ram shaft joining part 35, the valve part 80, and the second weight part 52 rotate around the first central axis C1.

The first weight part 51 is disposed on one side of the first rotating body 21 in the axial direction. The first weight part 51 has a semicircular plate shape. A surface of the first weight part 51 facing the other side in the axial direction comes into contact with the surface 21d of the first rotating body 21 facing one side in the axial direction. An outer end portion, that is, an outer circumferential portion, of the first weight part 51 in the first radial direction protrudes further outward in the first radial direction than the outer circumferential surface of the first rotating body 21. An outer circumferential portion of the first weight part 51 and the first bearing 31 overlap when viewed from the axial direction.

The first weight part 51 is fixed to the first rotating body 21 using a plurality of bolt members 53 arranged side by side in the first circumferential direction. Each of the bolt members 53 extends in the axial direction. Each of the bolt members 53 is inserted into a bolt insertion hole passing through the first weight part 51 in the axial direction and is screwed into a female screw hole of the first rotating body 21.

As illustrated in FIGS. 2 to 4 and 6, the second weight part 52 is connected to the second rotating body 22 and the ram shaft joining part 35 and the valve part 80 are located on opposite sides so that the second central axis C2 is arranged between the ram shaft joining part 35 and the valve part 80 in the second radial direction. The second weight part 52 functions as a so-called counterweight configured to maintain a good rotational balance in the second circumferential direction when the second rotating body 22, the ram shaft joining part 35, and the valve part 80 rotate around the second central axis C2.

The second weight part 52 protrudes outward in the second radial direction from the top wall portion 22b. A shape of the second weight part 52 and the top wall portion 22b as a whole is a substantial disc shape. The second weight part 52 is formed integrally with a part of the ram shaft joining part 35 and the top wall portion 22b.

As illustrated in FIG. 4, the shaft body 26 has a multi-stage columnar shape in which the shaft body 26 has the first central axis C1 as a center and extends in the axial direction. The shaft body 26 is disposed on the other side of the first rotating body 21 in the axial direction. The shaft body 26 is connected to the first rotating body 21. An outer diameter of the shaft body 26 is smaller than an outer diameter of the first rotating body 21. An outer diameter of an end portion of the shaft body 26 on one side in the axial direction is larger than an outer diameter of a portion of the shaft body 26 other than the end portion on one side in the axial direction. An end portion of the shaft body 26 on one side in the axial direction fits into an opening portion of the hole portion 21a of the first rotating body 21. The end portion of the shaft body 26 on one side in the axial direction is fixed to the end portion of the first rotating body 21 on the other side in the axial direction through a screw member or the like. That is to say, the shaft body 26 is fixed to the first rotating body 21.

The shaft body 26 is rotatably supported around the first central axis C1 through a third bearing (not shown). A rotational driving force in the first rotating direction T1 is input from a drive source (not shown) to the shaft body 26. The shaft body 26 and the first rotating body 21 are rotated in the first rotating direction T1 with respect to the housing 15 using a rotational driving force of the drive source.

The shaft body 26 includes a shaft body hole portion 26c.

The shaft body hole portion 26c is recessed from a surface of the shaft body 26 facing one side in the axial direction toward the other side in the axial direction and extends in the axial direction. The shaft body hole portion 26c has a multi-stage circular hole shape in which the shaft body hole portion 26c has the first central axis C1 as a center. The shaft body hole portion 26c opens on one side in the axial direction.

The shaft body hole portion 26c includes a large-diameter hole portion 26d and a small-diameter hole portion 26e.

The large-diameter hole portion 26d constitutes a portion of the shaft body hole portion 26c on one side in the axial direction. The large-diameter hole portion 26d is connected to the hole portion 21a of the first rotating body 21. The large-diameter hole portion 26d is disposed on the other side of the hole portion 21a in the axial direction. An inner diameter dimension of the large-diameter hole portion 26d is smaller than an inner diameter dimension of the hole portion 21a. An axial dimension of the large-diameter hole portion 26d is larger than an axial dimension of the hole portion 21a.

The small-diameter hole portion 26e constitutes a portion of the shaft body hole portion 26c on the other side in the axial direction. The small-diameter hole portion 26e is disposed on the other side of the large-diameter hole portion 26d in the axial direction. An inner diameter dimension of the small-diameter hole portion 26e is smaller than an inner diameter dimension of the large-diameter hole portion 26d. An axial dimension of the small-diameter hole portion 26e is larger than an axial dimension of the large-diameter hole portion 26d.

Figure 9:
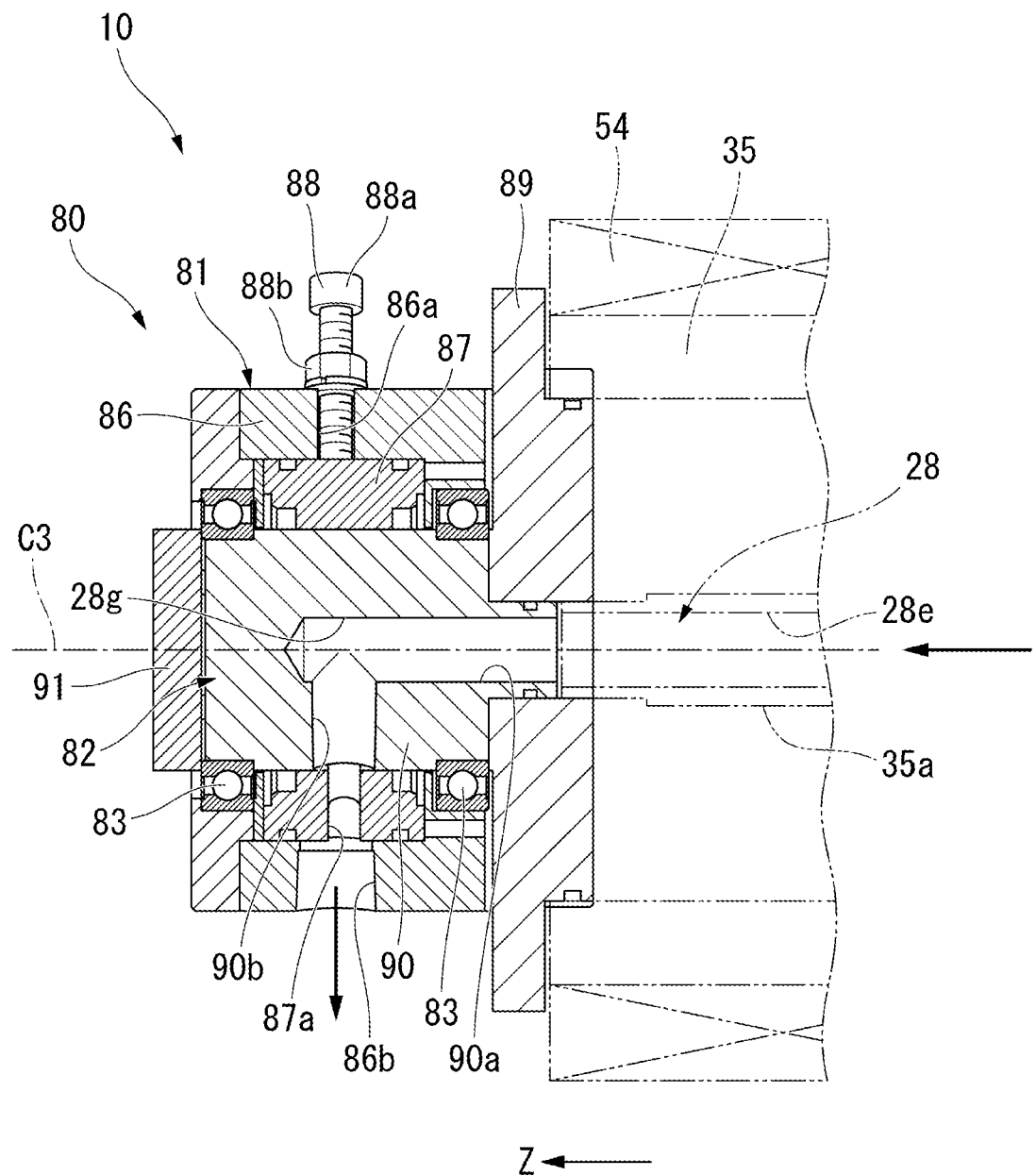
FIG. 9 is a cross-sectional view illustrating a cross section taken along IX-IX of FIG. 7.

As illustrated in FIGS. 1 and 9, the valve part 80 is connected to the ram shaft joining part 35. The valve part 80 is disposed on one side of the ram shaft joining part 35 in the axial direction. The valve part 80 is attached to the ram shaft joining part 35 and the ram shaft 3. The valve part 80 has air which can flow therein and constitutes a part of a flow path of the air supply path 28.

The valve part 80 has a flow mode (states illustrated in FIGS. 9 and 10) in which air can pass through the inside thereof and a cutoff mode (not shown) in which air cannot pass through the inside thereof to be switched between in accordance with a rotation position around the third central axis C3 of the ram shaft joining part 35.

As illustrated in FIGS. 7 to 10, the valve part 80 includes a ram shaft fixing part 81, a rotating part 82, and valve bearings 83.

The ram shaft fixing part 81 is fixed to the ram shaft 3. To be specific, the ram shaft fixing part 81 is fixed to a connecting rod located at one end portion of the ram shaft 3 using bolt members 84 (refer to FIG. 1).

The ram shaft fixing part 81 includes a fixing plate part 85, a fixing cylinder part 86, an outer cylinder part 87, an long air hole 87a, and a fixing screw 88.

The fixing plate part 85 has a plate shape in which the fixing plate part 85 extends in a direction perpendicular to the third central axis C3. In the embodiment, the fixing plate part 85 has a substantially quadrangular plate shape. The fixing plate part 85 is attached to one end portion of the ram shaft 3 using the plurality of bolt members 84.

The fixing cylinder part 86 has a tubular shape in which the fixing cylinder part 86 has the third central axis C3 as a center and extends in the axial direction. The fixing cylinder part 86 protrudes from a plate surface of the fixing plate part 85 facing one side in the axial direction toward one side in the axial direction. The fixing cylinder part 86 is fixed to the ram shaft 3 via the fixing plate part 85.

Figure 10:
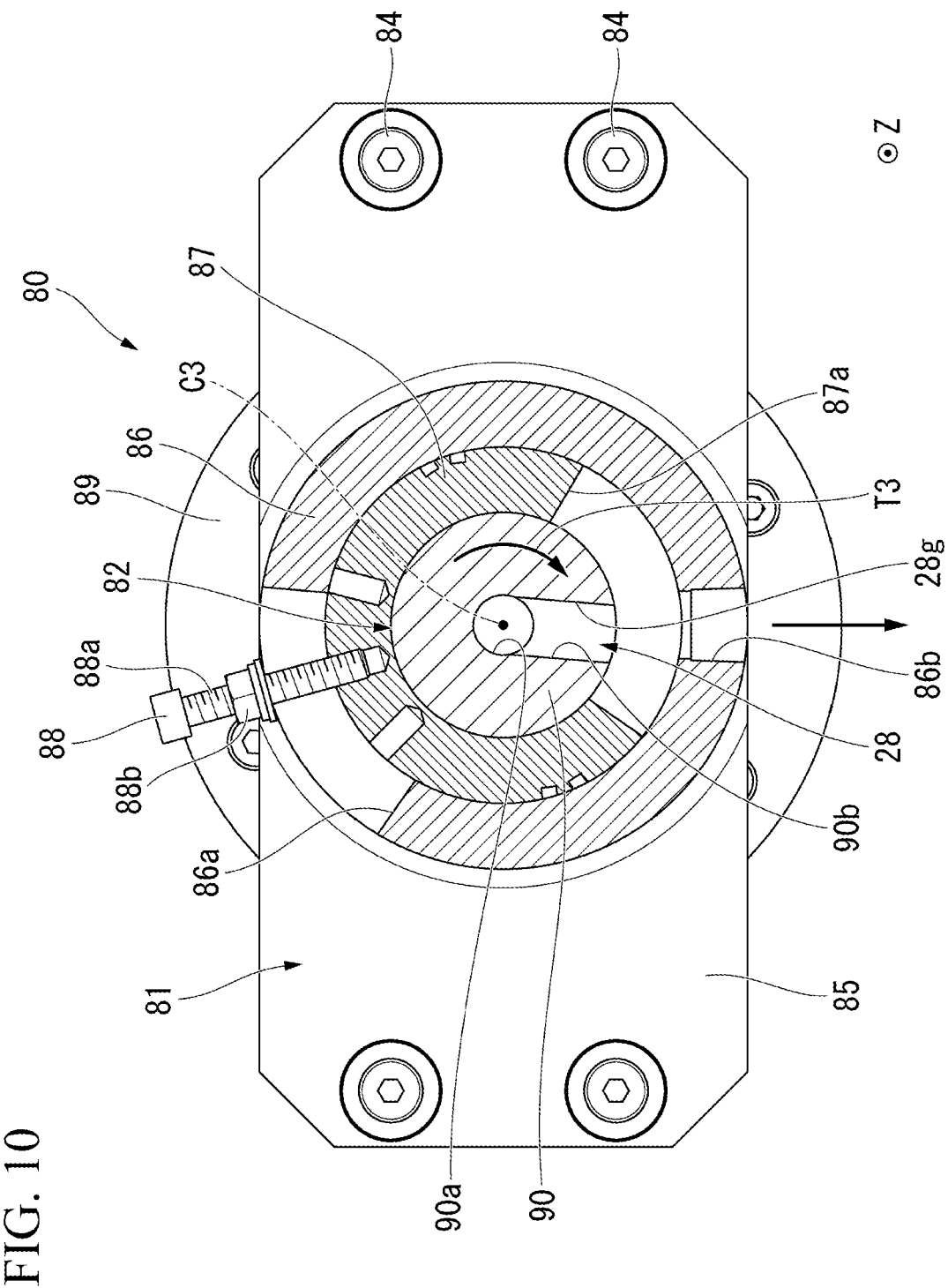
FIG. 10 is a cross-sectional view illustrating a cross section taken along X-X of FIG. 8.

As illustrated in FIGS. 9 and 10, the fixing cylinder part 86 includes a long adjusting hole 86a and an air connection port 86b.

The long adjusting hole 86a passes through the fixing cylinder part 86 in the third radial direction and extends around the third central axis C3. In the illustrated example, the long adjusting hole 86a is arranged in an upper portion of the fixing cylinder part 86 in a vertical direction.

The air connection port 86b is a hole which passes through the fixing cylinder part 86 in the third radial direction. In the illustrated example, the air connection port 86b is arranged in a lower portion of the fixing cylinder part 86 in the vertical direction. One end portion of the piping member 73 such as a hose is connected to the air connection port 86b (refer to FIG. 1). The other end portion of the piping member 73 is connected to a piping connection port of the ram shaft 3.

The outer cylinder part 87 has a tubular shape in which the outer cylinder part 87 has the third central axis C3 as a center and extends in the axial direction. The outer cylinder part 87 has a cylindrical shape. The outer cylinder part 87 slidably fits into the fixing cylinder part 86. An outer circumferential surface of the outer cylinder part 87 rotatably comes into contact with the inner circumferential surface of the fixing cylinder part 86 in a sliding manner in the third circumferential direction. That is to say, the fixing cylinder part 86 is located outside the outer cylinder part 87 in the third radial direction.

The long air hole 87a passes through the outer cylinder part 87 in the third radial direction and extends around the third central axis C3. The long air hole 87a has a slit shape in which the long air hole 87a extends through a circumferential wall of the outer cylinder part 87 over a prescribed range in the third circumferential direction. In the illustrated example, the long air hole 87a is arranged in a lower portion of the outer cylinder part 87 in the vertical direction. At least a part of the long air hole 87a faces the air connection port 86b in the third radial direction. That is to say, the long air hole 87a and the air connection port 86b communicate with each other. When the outer cylinder part 87 rotates around the third central axis C3 with respect to the fixing cylinder part 86, the position of the long air hole 87a around the third central axis C3 can be adjusted.

The fixing screw 88 fixes the fixing cylinder part 86 and the outer cylinder part 87. The fixing screw 88 is inserted into the long adjusting hole 86a and screwed to the outer cylinder part 87.

The fixing screw 88 has a bolt 88a and a nut 88b. The bolt 88a is inserted into the long adjusting hole 86a from the outside in the third radial direction and screwed to a female screw hole which opens in the outer circumferential surface of the outer cylinder part 87. The nut 88b is screwed to a male screw portion of the bolt 88a and comes into contact with an outer circumferential surface of the fixing cylinder part 86 from the outside in the third radial direction.

When the nut 88b is tightened inward in the third radial direction in a state in which the bolt 88a is screwed to the outer cylinder part 87, the fixing cylinder part 86 and the outer cylinder part 87 are fixed and the relative movement of the fixing cylinder part 86 and the outer cylinder part 87 in the third circumferential direction is restricted. Thus, the long air hole 87a is positioned in the third circumferential direction.

The rotating part 82 is connected to the ram shaft joining part 35 and is relatively rotatable around the ram shaft fixing part 81 and the third central axis C3. In the embodiment, the rotating part 82 is relatively rotatably joined to the ram shaft fixing part 81 in the third circumferential direction using the pair of valve bearings 83 disposed apart from each other in the axial direction. The pair of valve bearings 83 are disposed on one side of the outer cylinder part 87 in the axial direction and the other side thereof in the axial direction. That is to say, the outer cylinder part 87 is located between the pair of valve bearings 83 in the axial direction.

The rotating part 82 includes an attachment plate 89, an inner cylinder part 90, an axial flow path 90a, a radial flow path 90b, and an inner ring pressing plate 91.

The attachment plate 89 has an annular plate shape in which the attachment plate 89 has the third central axis C3 as a center and extends in a direction perpendicular to the third central axis C3. An outer circumferential portion of the attachment plate 89 is fixed to one end portion of the ram shaft joining part 35 in the axial direction through screwing or the like. That is to say, the rotating part 82 is fixed to the ram shaft joining part 35. The outer circumferential portion of the attachment plate 89 presses an inner ring (not shown) of the connecting bearing 54 from one side in the axial direction. The air cylinder 35a fits to an inner circumferential portion of the attachment plate 89.

The inner cylinder part 90 has a tubular shape in which the inner cylinder part 90 has the third central axis C3 as a center and extends in the axial direction. The inner cylinder part 90 protrudes from the attachment plate 89 to one side in the axial direction. The inner cylinder part 90 has an eclipsed cylindrical shape. The inner cylinder part 90 has a circumferential wall and a top wall connected to one end portion of the circumferential wall in the axial direction. The inner cylinder part 90 slidably fits into the outer cylinder part 87. An outer circumferential surface of the inner cylinder part 90 rotatably comes into contact with an inner circumferential surface of the outer cylinder part 87 in a sliding manner in the third circumferential direction. That is to say, the inner cylinder part 90 is located inside the outer cylinder part 87 in the third radial direction. An end portion of the inner cylinder part 90 on the other side in the axial direction fits to the inner circumferential portion of the attachment plate 89. The inner cylinder part 90 and the attachment plate 89 are fixed to each other through screwing or the like. That is to say, the inner cylinder part 90 is fixed to the ram shaft joining part 35 via the attachment plate 89. For this reason, when the can body maker 1 is in operation, the inner cylinder part 90 rotates about the third central axis C3 in the third rotating direction T3 together with the ram shaft joining part 35.

The axial flow path 90a extends inside the inner cylinder part 90 in the axial direction. The axial flow path 90a is arranged on the third central axis C3. An end portion of the axial flow path 90a on one side in the axial direction is closed by the top wall of the inner cylinder part 90. An end portion of the axial flow path 90a on the other side in the axial direction opens in a surface of the inner cylinder part 90 facing the other side in the axial direction. The axial flow path 90a communicates with the inside of the air cylinder 35a. The axial flow path 90a is connected to a fourth air flow path (an air flow path) 28e which will be described later of the ram shaft joining part 35.

The radial flow path 90b extends inside the inner cylinder part 90 in the third radial direction and opens in the outer circumferential surface of the axial flow path 90a and the inner cylinder part 90. When the inner cylinder part 90 rotates in the third circumferential direction with respect to the outer cylinder part 87, the radial flow path 90b communicates with the long air hole 87a in a prescribed range around the third central axis C3.

As illustrated in FIG. 10, a state in which the radial flow path 90b and the long air hole 87a face each other in the third radial direction and the radial flow path 90b and the long air hole 87a communicate with each other corresponds to a flow mode of the valve part 80. In the flow mode, the inside of the air cylinder 35a (the fourth air flow path 28e) and the inside of the piping member 73 (the piping flow path 72b) communicate with each other through the inside of the valve part 80, that is, the axial flow path 90a, the radial flow path 90b, the long air hole 87a, and the air connection port 86b. For this reason, in the flow mode, air is supplied from the ram shaft joining part 35 to the ram shaft 3 through the inside of the valve part 80.

Although not particularly illustrated, a state in which the radial flow path 90b and the long air hole 87a do not face each other in the third radial direction and the communication between the radial flow path 90b and the long air hole 87a is cut off corresponds to a cutoff mode of the valve part 80. In the cutoff mode, the communication between the inside of the air cylinder 35a (the fourth air flow path 28e) and the inside of the piping member 73 (the piping flow path 72b) through the inside of the valve part 80 is cut off. For this reason, in the cutoff mode, the supply of air from the ram shaft joining part 35 to the ram shaft 3 through the inside of the valve part 80 is cut off (stopped).

Figure 7:
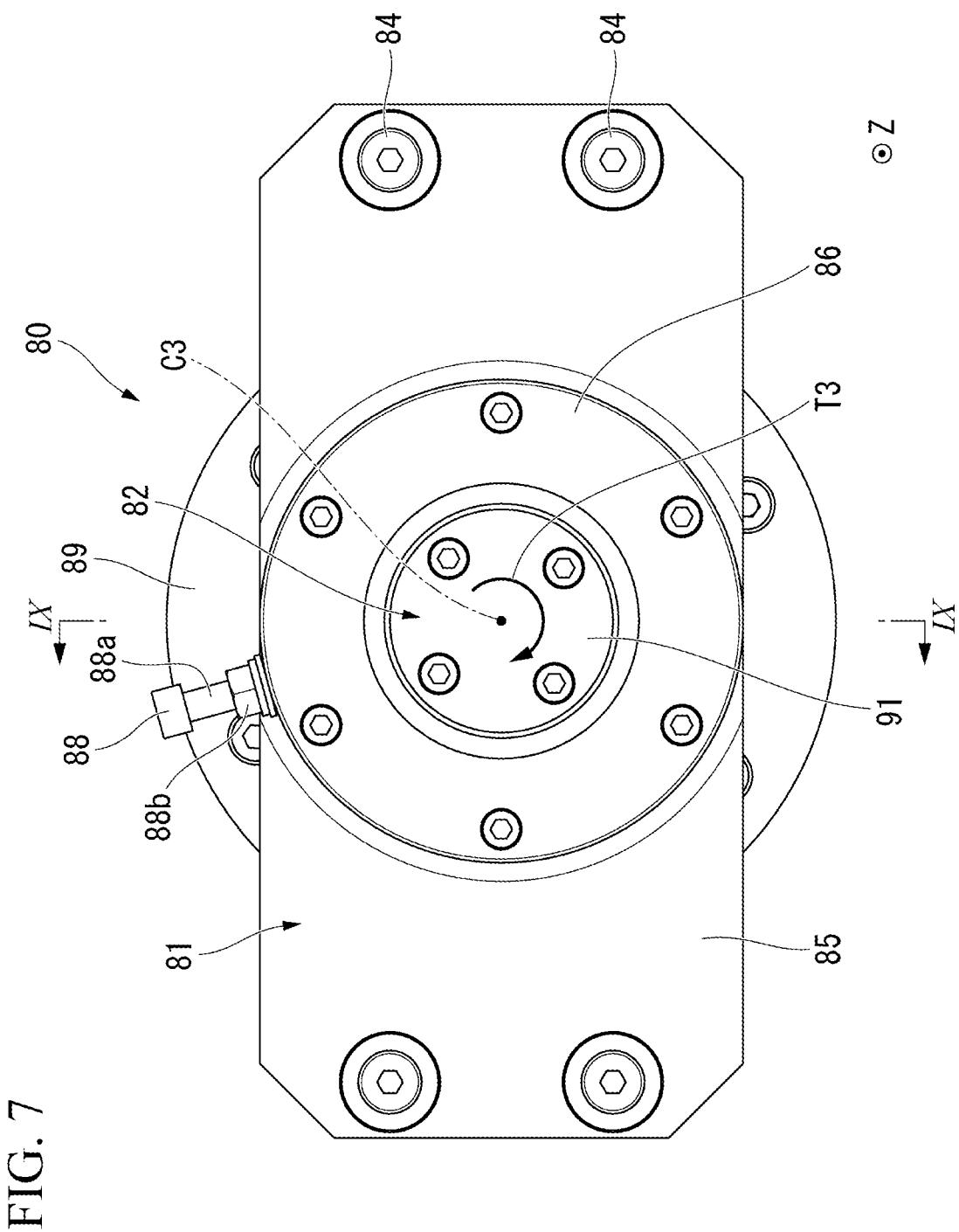
FIG. 7 is a front view illustrating a valve part.
Figure 8:
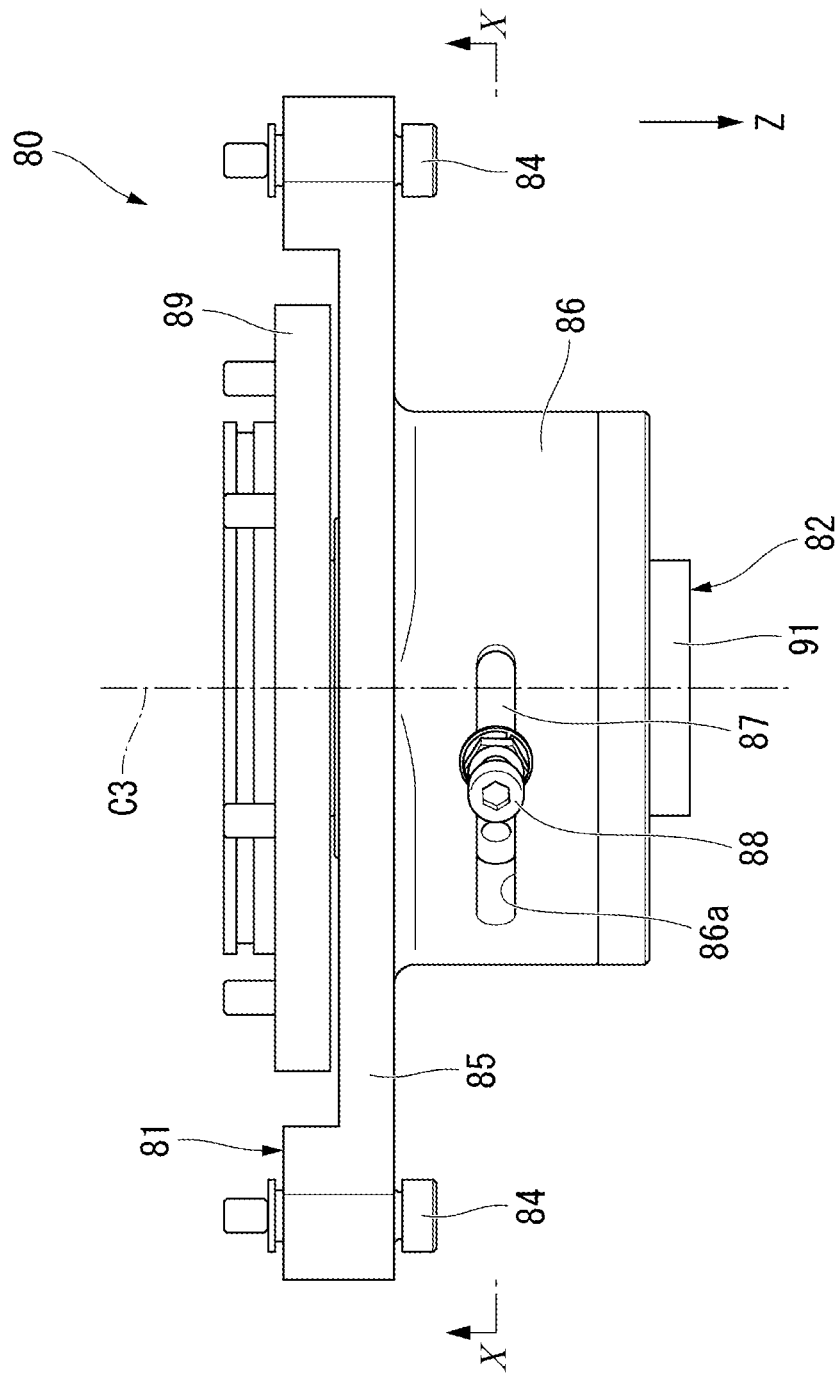
FIG. 8 is a top view illustrating the valve part.

As illustrated in FIGS. 7 to 9, the inner ring pressing plate 91 has a disc shape in which the inner ring pressing plate 91 has the third central axis C3 as a center and extends in a direction perpendicular to the third central axis C3. The inner ring pressing plate 91 is fixed to an end portion of the inner cylinder part 90 on one side in the axial direction, that is, the top wall through screwing or the like. An outer circumferential portion of the inner ring pressing plate 91 presses, from one side in the axial direction, an inner ring of one valve bearing 83 of the pair of valve bearings 83 which is disposed on one side of the outer cylinder part 87 in the axial direction.

As illustrated in FIGS. 4 and 9, the air supply path 28 is an air flow path formed inside the reciprocating linear motion mechanism 10. The air supply path 28 extends over the inside of the shaft body 26, the inside of the first rotating body 21, the inside of the convex part 25, the inside of the air joint member 40, the inside of the top wall portion 22b of the second rotating body 22, the inside of the ram shaft joining part 35, and the inside of the valve part 80. That is to say, the air supply path 28 passes through the insides of the first rotating body 21, the air joint member 40, the second rotating body 22, the ram shaft joining part 35, and the valve part 80.

The air supply path 28 includes a first air flow path 28a, an air chamber 29, a second air flow path 28b, an air joint flow path 28c, a third air flow path 28d, the fourth air flow path 28e, and a valve part flow path 28g. The first air flow path 28a, the air chamber 29, the second air flow path 28b, the air joint flow path 28c, the third air flow path 28d, the fourth air flow path 28e, and the valve part flow path 28g communicate with each other. Air supplied from the air supply source (not shown) to the air supply path 28 is directed from an upstream side to a downstream side inside the air supply path 28 and flows through the first air flow path 28a, the air chamber 29, the second air flow path 28b, the air joint flow path 28c, the third air flow path 28d, the fourth air flow path 28e, and the valve part flow path 28g in this order.

As illustrated in FIG. 4, the first air flow path 28a is disposed inside the shaft body 26. In the embodiment, the first air flow path 28a is located on the other side of the shaft body 26 in the axial direction and extends on the first central axis C1 in the axial direction.

The air chamber 29 is disposed at least inside the first rotating body 21. The air chamber 29 extends on the first central axis C1 in the axial direction. The air chamber 29 has the largest flow path cross-sectional area and largest volume among the flow paths constituting the air supply path 28. The air chamber 29 can temporarily store air (compressed air) inside the air chamber 29. That is to say, air is stored in the air chamber 29. In the embodiment, the air chamber 29 is disposed over the inside of the first rotating body 21 and the inside of the shaft body 26. The air chamber 29 is formed over the hole portion 21*a* of the first rotating body 21 and the shaft body hole portion 26*c* of the shaft body 26.

A volume of the air chamber 29 is the total volume or more of the air flow path located on a downstream side of the air chamber 29. To be specific, the volume is a sum of the volumes or more of the second air flow path 28*b*, the air joint flow path 28*c*, the third air flow path 28*d*, the fourth air flow path 28*e*, the valve part flow path 28*g*, the air communication path 72, and the air discharge hole 71.

The air chamber 29 includes a first chamber 61 disposed inside the first rotating body 21 and a second chamber 62 disposed inside the shaft body 26 and integrally formed with the first chamber 61.

The first chamber 61 is a chamber defined by the hole portion 21*a* and an end surface of the shaft body 26 facing one side in the axial direction. The first chamber 61 has an inner diameter dimension larger than that of the second chamber 62 and an axial dimension smaller than that of the second chamber 62.

The second chamber 62 is a chamber defined by the shaft body hole portion 26*c*. The second chamber 62 has an inner diameter dimension smaller than that of the first chamber 61 and an axial dimension larger than that of the first chamber 61.

The second chamber 62 includes a large-diameter chamber 62*a* and a small-diameter chamber 62*b*.

The large-diameter chamber 62*a* is formed using the large-diameter hole portion 26*d*. The large-diameter chamber 62*a* is located on one side of the second chamber 62 in the axial direction and is connected to the first chamber 61.

The small-diameter chamber 62*b* is formed using the small-diameter hole portion 26*e*. The small-diameter chamber 62*b* is located on the other side of the second chamber 62 in the axial direction. The small-diameter chamber 62*b* has an inner diameter dimension smaller than that of the large-diameter chamber 62*a* and an axial dimension larger than that of the large-diameter chamber 62*a*.

The second air flow path 28*b* is arranged over the inside of the first rotating body 21 and the inside of the convex part 25. The second air flow path 28*b* extends on the second central axis C2 in the axial direction. An end portion of the second air flow path 28*b* on the other side in the axial direction opens in the hole portion 21*a*. An end portion of the second air flow path 28*b* on one side in the axial direction opens in a surface of the convex part 25 facing one side in the axial direction.

The air joint flow path 28*c* has the retainer air hole 41*a*, the inside of the inner cylinder 43 (an internal space), the inner cylinder air hole 43*b*, the inner cylinder air groove 43*a*, and the outer cylinder air hole 42*a*. Air flowing from the second air flow path 28*b* into the air joint flow path 28*c* flows through the retainer air hole 41*a*, the inside of the inner cylinder 43, the inner cylinder air hole 43*b*, the inner cylinder air groove 43*a*, and the outer cylinder air hole 42*a* in this order and flows out to the third air flow path 28*d*.

The third air flow path 28*d* is disposed inside the top wall portion 22*b* and extends in the second radial direction. The third air flow path 28*d* extends along a virtual straight line connecting the third central axis C3 of the ram shaft joining part 35 to the second central axis C2 when viewed from the axial direction. An inner end portion of the third air flow path 28*d* in the second radial direction is connected to the outer cylinder air hole 42*a*. An outer end portion of the third air flow path 28*d* in the second radial direction is closed using a plug part 28*f*.

The fourth air flow path 28*e* is arranged inside the ram shaft joining part 35. The fourth air flow path 28*e* extends on the third central axis C3 of the ram shaft joining part 35 in the axial direction. An end portion of the fourth air flow path 28*e* on the other side in the axial direction is connected to the third air flow path 28*d*. As illustrated in FIG. 9, an end portion of the fourth air flow path 28*e* on one side in the axial direction is connected to the axial flow path 90*a* constituting a part of an internal space of the valve part 80. A portion of the fourth air flow path 28*e* other than the end portion on the other side in the axial direction is formed by (an internal space of) the air cylinder 35*a*.

The valve part flow path 28*g* has the axial flow path 90*a*, the radial flow path 90*b*, the long air hole 87*a*, and the air connection port 86*b*. Air flowing from the fourth air flow path 28*e* into the inside of the valve part 80 (the internal space) flows through the axial flow path 90*a*, the radial flow path 90*b*, the long air hole 87*a*, and the air connection port 86*b* in this order and flows out to the piping flow path 72*b* only when the valve part 80 is in the flow mode.

As illustrated in FIG. 4, each of the first oil supply path 36 passes through the housing 15 and supplies oil to the first bearing 31. In the embodiment, the first oil supply path 36 passes through a circumferential wall of the housing main body 17. An outer end portion of the first oil supply path 36 in the first radial direction opens in an outer circumferential surface of the housing main body 17. An inner end portion of the first oil supply path 36 in the first radial direction opens in an inner circumferential surface of the housing main body 17. That is to say, the first oil supply path 36 extends inside the housing 15 and opens toward the first bearing 31. Oil is supplied is supplied from the outside of the housing 15 to the first oil supply path 36 via a first oil supply port 36*a* (refer to FIG. 2) provided in an outer circumferential portion of the housing main body 17.

The plurality of first oil supply paths 36 are provided. The plurality of first oil supply paths 36 are arranged spaced apart from each other in the first circumferential direction. The plurality of first oil supply paths 36 include one first oil supply path 36 extending linearly in the housing main body 17 and another first oil supply path 36 bending in the housing main body 17 and extending in a crank shape.

In the embodiment, at least one first oil supply path 36 is arranged in a portion of the housing main body 17 located above the first central axis C1 in the vertical direction. For this reason, the oil supplied from above to the first bearing 31 is stably and easily delivered throughout the first bearing 31.

As illustrated in FIG. 4, each of the second oil supply paths 37 passes through the internal gear 16 and the external gear 23 and supplies oil to the second bearing 32. The second oil supply path 37 has internal gear flow paths 37*a* and external gear flow paths 37*b*.

Each of the internal gear flow paths 37*a* passes through a circumferential wall of the internal gear 16. In the embodiment, the internal gear flow path 37*a* passes through the internal gear 16 in the first radial direction. An outer end portion of the internal gear flow path 37*a* in the first radial direction opens in an outer circumferential surface of the internal gear 16. An inner end portion of the internal gear flow path 37*a* in the first radial direction opens in an inner circumferential surface, that is, to the internal teeth 16*a* of the internal gear 16. That is to say, the internal gear flow path 37*a* extends inside the internal gear 16 and opens at least to the internal teeth 16*a*. Oil is supplied from the outside of the housing 15 to the internal gear flow path 37*a* via a second oil supply port 37*c* provided in an outer circumferential portion of the internal gear 16.

Each of the external gear flow paths 37b passes through a circumferential wall of the external gear 23. In the embodiment, the external gear flow path 37b passes through the external gear 23 in the second radial direction. An outer end portion of the external gear flow path 37b in the second radial direction opens in an outer circumferential surface, that is, to the external teeth 23a of the external gear 23. An inner end portion of the external gear flow path 37b in the second radial direction opens in an inner circumferential surface of the second outer ring support part 23b. That is to say, the external gear flow path 37b has a portion extending inside the external gear 23 and opening to the external teeth 23a and a portion opening toward the second bearing 32.

The plurality of second oil supply paths 37 are provided. That is to say, a plurality of sets of the internal gear flow paths 37a and the external gear flow paths 37b are provided. In the embodiment, for example three or more second oil supply paths 37 are provided. That is to say, three or more sets of the internal gear flow paths 37a and the external gear flow paths 37b are provided. The plurality of internal gear flow paths 37a are arranged to be spaced apart from each other in the first circumferential direction. The plurality of external gear flow paths 37b are arranged to be spaced apart from each other in the second circumferential direction.

Although not particularly illustrated, when the external gear 23 is disposed at a prescribed position around the first central axis C1 with respect to the internal gear 16, the internal gear flow paths 37a and the external gear flow paths 37b face each other in the first radial direction and communicate with each other. To be specific, when the external gear 23 revolves in the first circumferential direction along the inner circumferential portion of the internal gear 16 while rotating in the second circumferential direction and is disposed at a prescribed position in the first circumferential direction, the internal gear flow path 37a and the external gear flow path 37b communicate with each other via a meshing portion between the internal teeth 16a and the external teeth 23a. Thus, oil in the internal gear flow path 37a flows into the external gear flow path 37b and the oil which has flowed into the external gear flow path 37b flows in the external gear flow path 37b inward in the second radial direction and is discharged toward the second bearing 32.

The internal teeth 16a included in the internal gear 16 is twice the number of external teeth 23a included in the external gear 23. For this reason, the internal gear flow path 37a and the external gear flow path 37b face each other at prescribed positions for each rotation, that is, for each revolution around the first central axis C1 of the external gear 23. That is to say, the inflow of oil from the internal gear flow path 37a to the external gear flow path 37b and the discharge of oil from the external gear flow path 37b to the second bearing 32 are performed every revolution of the external gear 23.

In the embodiment, at least one internal gear flow path 37a is arranged in a portion of the internal gear 16 located above the first central axis C1 in the vertical direction. Furthermore, at least one external gear flow path 37b faces and communicates with the internal gear flow path 37a in a portion of the external gear 23 located above the second central axis C2 in the vertical direction. That is to say, when the internal gear flow path 37a communicates with the external gear flow path 37b, the oil flowing through the internal gear flow path 37a is supplied to the second bearing 32 from above through the external gear flow path 37b. For this reason, the oil is stably and easily delivered throughout the second bearing 32.

Although not particularly illustrated, the gear has an annular plate shape in which the gear has the first central axis C1 as a center. An inner circumferential surface of the gear fits to an outer circumferential surface of the shaft body 26 on one side in the axial direction. A surface of the gear facing one side in the axial direction comes into contact with the surface 21e of the first rotating body 21 facing the other side in the axial direction. The gear is fixed to the surface 21e of the first rotating body 21 facing the other side in the axial direction through screwing or the like. That is to say, the gear is provided on the first rotating body 21. The gear may be fixed to the shaft body 26. At least a part of the gear is exposed to the outside of the housing 15. The gear is connected to the cup holder drive mechanism (not shown) or the like via a joining gear (not shown) or the like. The gears outputs a rotational driving force around the first central axis C1 of the first rotating body 21 and the shaft body 26 to the outside of the reciprocating linear motion mechanism 10.

In the reciprocating linear motion mechanism 10 in the embodiment described above, if a rotational driving force around the first central axis C1 is transmitted from the drive source (not shown) to the shaft body 26 and the first rotating body 21, the first rotating body 21 is rotated around the first central axis C1 with respect to the housing 15. If the first rotating body 21 is rotated around the first central axis C1, the second rotating body 22 supported by the first rotating body 21 is also rotated around the first central axis C1.

At this time, since the external gear 23 of the second rotating body 22 and the internal gear 16 of the housing 15 are in mesh with each other, the second rotating body 22 is rotated (revolved) around the first central axis C1 and is also rotated (rotated) around the second central axis C2. When the reciprocating linear motion mechanism 10 is viewed from the axial direction, the first rotating direction T1 in which the second rotating body 22 revolves around the first central axis C1 and the second rotating direction T2 in which the second rotating body 22 rotates around the second central axis C2 are opposite to each other.

The ram shaft joining part 35 connected to the second rotating body 22 and the rotating part 82 of the valve part 80 linearly move in a reciprocating manner in a prescribed direction, that is, the stroke direction S in the first radial direction while rotating in the third rotating direction T3 around the third central axis C3.

In this way, the reciprocating linear motion mechanism 10 in the embodiment converts a rotational driving force input to the first rotating body 21 into a reciprocating linear motion in the stroke direction S and outputs the reciprocating linear motion to the ram shaft joining part 35. Thus, the punch 2 joined to the ram shaft joining part 35 via the ram shaft 3 is linearly moved in a reciprocating manner in the stroke direction S. The cup-shaped body W can be subjected to a DI process using the punch 2, the die 8, the cup holder 6, and the like and the cup-shaped body W can be formed into the DI can 100.

Also, since the air supply path 28 passes through the inside of the reciprocating linear motion mechanism 10 in the embodiment, air can be supplied from the inside of the reciprocating linear motion mechanism 10 to the punch 2 through the ram shaft 3. According to the embodiment, it is possible to further minimize the number of moving parts to a low level and to further reduce the frequency of maintenance and replacement of parts than the structure in which air is supplied from the outside of the reciprocating linear motion mechanism to the ram shaft as in the related art.

According to the embodiment, it is possible to minimize the frequency of maintenance of the air supply structure for air-blow and replacement of parts to a low level, the formed can 100 can be stably air-blown, jamming be minimized, and the production efficiency of the can 100 can be improved.

According to the embodiment, the air supply path 28 has the air chamber 29. Thus, when air is temporarily stored in the air chamber 29, the DI can (can) 100 is released from the punch 2 and it is possible to minimize a decrease in pressure when the air discharge hole 71, the air communication path 72, and the air supply path 28 (hereinafter referred to as the "air supply path 28 or the like") are opened to the atmosphere to a low level. That is to say, it is possible to alleviate a sudden decrease in pressure in the air supply path 28 or the like due to blow-off (release) of the formed can 100 using the air chamber 29 and it is possible to recover a pressure of the air supply path 28 or the like to a prescribed value in a short time. For this reason, an air supply pressure from the air supply path 28 or the like to the punch 2 is stable and the can 100 to be formed next can be stably released from the punch 2. The can 100 can be formed and blown off at a high speed, the can 100 with stable quality can be efficiently produced, and the productivity can be improved.

To be specific, since the air chamber 29 is disposed at least inside the first rotating body 21, a large volume of the air chamber 29 can be secured. For this reason, the function of the air chamber 29 described above is stable and the action and the effect of the embodiment are stably achieved.

Also, since the air chamber 29 integrally includes the first chamber 61 disposed inside the first rotating body 21 and the second chamber 62 disposed inside the shaft body 26 in the embodiment, a larger volume of the air chamber 29 as a whole is secured. It is possible to minimize a decrease in pressure of the air supply path 28 or the like when the can 100 is blown off from the punch 2 using the air chamber 29 to a low level. It is possible to stably release the can 100 from the punch 2.

Furthermore, in the embodiment, the first chamber 61 has an inner diameter dimension larger than that of the second chamber 62 and the second chamber 62 has an axial dimension larger than that of the first chamber 61.

Since the first rotating body 21 has a large outer diameter dimension, the first chamber 61 located inside the first rotating body 21 can easily secure a large inner diameter dimension. Since the shaft body 26 has a large axial dimension, the second chamber 62 located inside the shaft body 26 can easily secure a large axial dimension.

That is to say, according to the above constitution in the embodiment, a large volume of the air chamber 29 can be stably secured.

Also, in the embodiment, the second chamber 62 includes the large-diameter chamber 62a and the small-diameter chamber 62b.

In this case, the large-diameter chamber 62a secures a large volume in which air can be stored inside the shaft body 26. The small-diameter chamber 62b secures a volume in which air can be stored therein while the rigidity of the shaft body 26 is ensured.

Also, in the embodiment, the valve part 80 is switched between the flow mode and the cutoff mode in accordance with a rotation position around the third central axis C3 of the ram shaft joining part 35. That is to say, the valve part 80 switches the supply and the cutoff of air from the air supply path 28 to the ram shaft 3 in accordance with whether a mode is in the flow mode or the cutoff mode. To be specific, when the ram shaft joining part 35 is linearly moved in a reciprocating manner in a prescribed direction (the stroke direction S) while rotating around the third central axis C3, in a prescribed region in the stroke direction S, air is supplied to the ram shaft 3 through the valve part 80, and in a region different from the prescribed region, the supply of air to the ram shaft 3 through the valve part 80 is cut off.

In the embodiment, air can be discharged from the punch 2 into the can 100 in a timely manner by mechanically synchronizing with the operation of the reciprocating linear motion mechanism 10 and having a simple structure, compared to a case in which the discharge of air is controlled by electrically synchronizing with the operation of the reciprocating linear motion mechanism, for example, using solenoid valves, sensors, control units, or the like unlike the embodiment. For example, even when a forming rate or the like of the can 100 is changed, the formed can 100 can be blown off in a timely manner without requiring complicated adjustment work or the like to synchronize an air discharge timing.

According to the embodiment, it is possible to minimize the frequency of maintenance of the air supply structure for air-blow and replacement of parts to a low level, the formed can 100 can be stably air-blown, jamming can be minimized, and the production efficiency of the can 100 can be improved.

Also, in the embodiment, when the rotating part 82 rotates around the third central axis C3 with respect to the ram shaft fixing part 81 together with the ram shaft joining part 35 and the radial flow path 90b communicates with the long air hole 87a in a prescribed range around the third central axis C3, the valve part 80 is in the flow mode. In the flow mode, air is supplied from the air supply path 28 to the ram shaft 3.

Furthermore, when the rotating part 82 rotates around the third central axis C3 with respect to the ram shaft fixing part 81 together with the ram shaft joining part 35 and the communication between the radial flow path 90b and the long air hole 87a is cut off in another range different from the prescribed range around the third central axis C3, the valve part 80 is in the cutoff mode. In the cutoff mode, the supply of air from the air supply path 28 to the ram shaft 3 is cut off.

According to the above constitution in the embodiment, the formed can 100 can be blown off in a timely and stable manner with a simple structure.

Also, in the embodiment, when the outer cylinder part 87 is rotated around the third central axis C3 with respect to the fixing cylinder part 86, the location of the long air hole 87a around the third central axis C3 can be adjusted.

In this case, a timing at which the long air hole 87a communicates with the radial flow path 90b can be adjusted. That is to say, a timing at which air is discharged into the can 100 can be adjusted through a simple operation in which the outer cylinder part 87 is rotated around the third central axis C3. For this reason, the formed can 100 can be stably blown off from the punch 2.

Furthermore, in the embodiment, the fixing screw 88 is inserted into the long adjusting hole 86a and screwed into the outer cylinder part 87.

In this case, when the fixing cylinder part 86 and the outer cylinder part 87 are fixed through the fixing screw 88 in a state in which the outer cylinder part 87 is rotated around the third central axis C3 with respect to the fixing cylinder part 86 and the location of the long air hole 87a around the third central axis C3 is adjusted, the long air hole 87a can be positioned around the third central axis C3. That is to say, with a simple constitution, the location of the long air hole 87a around the third central axis C3 can be adjusted and the location can be fixed.

Also, in the embodiment, when viewed from the second radial direction, the internal gear 16, the external gear 23, the recess 27, the second bearing 32, and the convex part 25 are disposed to overlap each other. That is to say, since the locations of the internal gear 16, the external gear 23, the recess 27, the second bearing 32, and the convex part 25 in the axial direction are the same as each other, it is possible to minimize the bulkiness of the reciprocating linear motion mechanism 10 in the axial dimension. It is possible to minimize an external form of the reciprocating linear motion mechanism 10 in the axial direction and to simplify the structure thereof.

Furthermore, in the embodiment, it is possible to output a rotational driving force of the first rotating body 21 around the first central axis C1 to the outside of the reciprocating linear motion mechanism 10 via the gear. For example, the cup holder drive mechanism or the like other than the reciprocating linear motion mechanism 10 provided in the can body maker 1 can be stably operated while synchronized with the operation of the reciprocating linear motion mechanism 10.

The present invention is not limited to the above-described embodiment and the constitution can be changed without departing from the gist of the present invention, for example, as described below.

The shapes of the first weight part 51 and the second weight part 52 are not limited to the shapes described in the above-described embodiment.

Also, although an example in which the air chamber 29 is disposed at least inside the first rotating body 21 has been described in the above-described embodiment, the present invention is not limited thereto. In the present invention, the air chamber may be disposed in a part of the air discharge mechanism 70 of the can body maker 1. That is to say, for example, the air chamber may be disposed in a member other than the first rotating body 21 of the reciprocating linear motion mechanism 10 or may be disposed in a member (not shown) on the upstream side of the air from the reciprocating linear motion mechanism 10. Furthermore, although not particularly illustrated, the valve part may be provided in the ram shaft 3 or the punch 2, and in this case, the air chamber may be disposed in the ram shaft 3 or the punch 2 on the downstream side of the air from the reciprocating linear motion mechanism 10.

The present invention may combine the constitutions described in the above-described embodiments and modifications, and the like as long as the gist of the present invention is not deviated and additions, omissions, replacements, other changes of the constitutions are possible. Furthermore, the present invention is not limited by the above-described embodiments and the like, but is limited only by the claims.

According to the reciprocating linear motion mechanism for the can body maker and the can body maker of the present invention, it is possible to minimize the frequency of maintenance of the air supply structure and replacement of parts to a low level, the formed can be stably air-blown, jamming can be minimized, and the production efficiency of the can be improved. Furthermore, it is possible to minimize a decrease in pressure in the air flow path to a low level while air is supplied to ram shaft through the inside of the reciprocating linear motion mechanism and the formed can can be stably released from the punch. In addition, air can be supplied to the ram shaft through the inside of the reciprocating linear motion mechanism and the formed can can be blown off in a timely manner. Therefore, the industrial applicability is provided.

EXPLANATION OF REFERENCES

1 Can body maker
2 Punch
3 Ram shaft
6 Cup holder
7 Through hole
8 Die
9 End surface
10 Reciprocating linear motion mechanism
15 Housing
16 Internal gear
21 First rotating body
22 Second rotating body
23 External gear
26 Shaft body
28 Air supply path
28e Fourth air flow path (air flow path of ram shaft joining part)
29 Air chamber
35 Ram shaft joining part
61 First chamber
62 Second chamber
62a Large-diameter chamber
62b Small-diameter chamber
70 Air discharge mechanism
80 Valve part
81 Ram shaft fixing part
82 Rotating part
86 Fixing cylinder part
86a Long adjusting hole
87 Outer cylinder part
87a Long air hole
88 Fixing screw
90 Inner cylinder part
90a Axial flow path
90b Radial flow path
100 DI can (can)
C1 First central axis
C2 Second central axis
C3 Third central axis

What is claimed is:

1. A reciprocating linear motion mechanism for a can body maker, comprising:
a housing including an internal gear having a first central axis as a center;
a first rotating body located inside the housing and relatively rotatably joined to the housing;
a second rotating body including an external gear having a second central axis parallel to the first central axis as a center and meshing with the internal gear and relatively rotatably joined to the first rotating body;
a ram shaft joining part connected to the second rotating body and configured to be linearly moved in a reciprocating manner in a prescribed direction; and
an air supply path passing through insides of the first rotating body, the second rotating body, and the ram shaft joining part, wherein
the air supply path includes an air chamber that is arranged in the first rotating body and configured to store air therein, said air chamber being coaxially aligned with the first central axis.

2. The reciprocating linear motion mechanism for a can body maker according to claim 1, comprising:
a shaft body extending in an axial direction and connected to the first rotating body, wherein the second rotating body is disposed on one side of the first rotating body in the axial direction, the shaft body is disposed on the other side of the first rotating body in the axial direction, and the air chamber includes:

a first chamber disposed inside the first rotating body; and a second chamber disposed inside the shaft body and integrally formed with the first chamber.

3. The reciprocating linear motion mechanism for a can body maker according to claim 2, wherein the first chamber has an inner diameter dimension larger than that of the second chamber, and the second chamber has an axial dimension larger than that of the first chamber.

4. The reciprocating linear motion mechanism for a can body maker according to claim 2, wherein the second chamber includes:

a large-diameter chamber located on a portion of the second chamber on one side in the axial direction and connected to the first chamber; and a small-diameter chamber located on a portion of the second chamber on the other side in the axial direction and having an inner diameter dimension smaller than that of the large-diameter chamber.

5. A can body maker, comprising:

the reciprocating linear motion mechanism for a can body maker according to claim 1;

a ram shaft extending in the prescribed direction and having one end portion to which the ram shaft joining part is joined;

a punch disposed at the other end portion of the ram shaft;

a die having a through hole into which the punch is inserted;

a cup holder pressed against an end surface of the die in which the through hole opens; and an air discharge mechanism configured to supply air to the punch through an inside of the reciprocating linear motion mechanism for a can body maker and the ram shaft, wherein the air discharge mechanism includes the air supply path.

6. A reciprocating linear motion mechanism of a can body maker, comprising:

a housing including an internal gear having a first central axis as a center;

a first rotating body located inside the housing and relatively rotatably joined to the housing;

a second rotating body including an external gear having a second central axis parallel to the first central axis as a center and meshing with the internal gear and relatively rotatably joined to the first rotating body;

a ram shaft joining part connected to the second rotating body, having a third central axis parallel to the second central axis as a center, and being linearly moved in a reciprocating manner in a prescribed direction while rotating around the third central axis;

a valve part connected to the ram shaft joining part; and an air supply path passing through insides of the first rotating body, the second rotating body, the ram shaft joining part, and the valve part, wherein the valve part has a flow mode in which air is able to pass therein and a cutoff mode in which air is unable to pass therein switched between in accordance with a rotation position around the third central axis of the ram shaft joining part.

7. The reciprocating linear motion mechanism of a can body maker according to claim 6, wherein the valve part includes:

a ram shaft fixing part; and a rotating part connected to the ram shaft joining part and relatively rotatable around the ram shaft fixing part and the third central axis, wherein the ram shaft fixing part includes:

an outer cylinder part having the third central axis as a center; and a long air hole passing through the outer cylinder part in a radial direction orthogonal to the third central axis and extending the third central axis, the rotating part includes:

an inner cylinder part located inside the outer cylinder part in the radial direction;

an axial flow path extending in an axial direction inside the inner cylinder part and connected to an air flow path of the ram shaft joining part; and a radial flow path extending in the radial direction inside the inner cylinder part and opening in outer circumferential surfaces of the axial flow path and the inner cylinder part, wherein the radial flow path communicates with the long air hole in a prescribed range around the third central axis.

8. The reciprocating linear motion mechanism for a can body maker according to claim 7, wherein, when the outer cylinder part rotates around the third central axis, a location of the long air hole around the third central axis is able to be adjusted.

9. The reciprocating linear motion mechanism for a can body maker according to claim 8, wherein the ram shaft fixing part includes:

the outer cylinder part;

a fixing cylinder part located outside the outer cylinder part in the radial direction; and a fixing screw configured to fix the fixing cylinder part and the outer cylinder part, the fixing cylinder part has a long adjusting hole passing through the fixing cylinder part in the radial direction and extending around the third central axis, and the fixing screw is inserted into the long adjusting hole and screwed to the outer cylinder part.

10. A can body maker, comprising:

the reciprocating linear motion mechanism for a can body maker according to claim 6;

a ram shaft extending in the prescribed direction and having one end portion to which the ram shaft joining part is joined;

a punch disposed at the other end portion of the ram shaft;

a die having a through hole into which the punch is inserted;

a cup holder pressed against an end surface of the die in which the through hole opens; and an air discharge mechanism configured to supply air to the punch through an inside of the reciprocating linear motion mechanism for a can body maker and the ram shaft, wherein the air discharge mechanism includes the air supply path.

* * * * *